(12) United States Patent
Takami et al.

(10) Patent No.: US 10,424,818 B2
(45) Date of Patent: Sep. 24, 2019

(54) SECONDARY BATTERY, BATTERY MODULE, BATTERY PACK, AND VEHICLE

(71) Applicant: Kabushiki Kaisha Toshiba, Minato-ku (JP)

(72) Inventors: Norio Takami, Yokohama (JP); Shinsuke Matsuno, Tokyo (JP); Kazuki Ise, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 21 days.

(21) Appl. No.: 15/690,524

(22) Filed: Aug. 30, 2017

(65) Prior Publication Data

US 2018/0241090 A1    Aug. 23, 2018

(30) Foreign Application Priority Data

Feb. 21, 2017  (JP) ................. 2017-030268

(51) Int. Cl.
*H01M 10/0563* (2010.01)
*H01M 10/36* (2010.01)
(Continued)

(52) U.S. Cl.
CPC ............. *H01M 10/36* (2013.01); *B60L 58/21* (2019.02); *H01M 2/1077* (2013.01);
(Continued)

(58) Field of Classification Search
CPC .... H01M 10/36; H01M 2/1077; H01M 4/485; H01M 10/425; H01M 10/625; H01M 10/3918; H01M 10/26; H01M 2010/4271; H01M 2004/027; H01M 2300/0005; H01M 2220/20; B60L 11/1864
See application file for complete search history.

(56) References Cited

U.S. PATENT DOCUMENTS 6,403,253 B1    6/2002  Wainwright et al.
2009/0253025 A1  10/2009  Whitacre
(Continued)

FOREIGN PATENT DOCUMENTS

DE  11 2015 002 091 T5   2/2017
JP        9-508490        8/1997
(Continued)

OTHER PUBLICATIONS

S. Liu et al. "Rechargeable Aqueous Lithium-Ion Battery of $TiO_2$/ $LiMn_2O_4$ with a High Voltage", Journal of the Electrochemical Society, 158, 2011, 8 pages.

(Continued)

*Primary Examiner* — Cynthia K Walls
(74) *Attorney, Agent, or Firm* — Oblon, McClelland, Maier & Neustadt, L.L.P.

(57) ABSTRACT

According to one embodiment, a secondary battery includes a positive electrode, a negative electrode and an aqueous electrolyte. The negative electrode includes a titanium-containing oxide. The aqueous electrolyte includes a sodium ion having a concentration of 3 mol/L or more and at least one type of first anion selected from the group consisting of $[N(FSO_2)_2]^-$, $SO_3^{2-}$, $S_2O_3^{2-}$ and $SCN^-$.

20 Claims, 8 Drawing Sheets

(51) Int. Cl.

| | | |
|---|---|---|
| *H01M 10/26* | (2006.01) | |
| *H01M 10/39* | (2006.01) | |
| *H01M 10/625* | (2014.01) | |
| *H01M 2/10* | (2006.01) | |
| *H01M 4/485* | (2010.01) | |
| *H01M 10/42* | (2006.01) | |
| *B60L 58/21* | (2019.01) | |
| *H01M 4/02* | (2006.01) | |

(52) U.S. Cl.
CPC .......... *H01M 4/485* (2013.01); *H01M 10/26* (2013.01); *H01M 10/3918* (2013.01); *H01M 10/425* (2013.01); *H01M 10/625* (2015.04); *H01M 2004/027* (2013.01); *H01M 2010/4271* (2013.01); *H01M 2220/20* (2013.01); *H01M 2300/0005* (2013.01); *Y02E 60/124* (2013.01)

(56) References Cited

U.S. PATENT DOCUMENTS

| | | |
|---|---|---|
| 2011/0086266 A1 | 4/2011 | Kondo |
| 2015/0137737 A1 | 5/2015 | Tanabe et al. |
| 2015/0155601 A1 | 6/2015 | Nakatsutsumi et al. |
| 2016/0156035 A1 | 6/2016 | Hung et al. |
| 2017/0047571 A1 | 2/2017 | Iwasaki et al. |

FOREIGN PATENT DOCUMENTS

| | | |
|---|---|---|
| JP | 2000-77073 | 3/2000 |
| JP | 2003-17057 | 1/2003 |
| JP | 2005-71807 | 3/2005 |
| JP | 2012-018778 | 1/2012 |
| JP | 5187350 | 4/2013 |
| JP | 2015-118846 | 6/2015 |
| JP | 5923747 | 5/2016 |
| JP | 2016-162742 | 9/2016 |
| WO | WO 2014/161746 A1 | 10/2014 |
| WO | WO 2016/114141 A1 | 7/2016 |

OTHER PUBLICATIONS

Mao-Sung Wu et al. "Electrochemical fabrication of anatase TiO2 nanostructure as an anode material for aqueous lithium-ion batteries", Journal of Power Sources, 185, 2008, 5 pages.

Yamada, Yuki, et al., "Electrochemistry", The Electrochemistry Society of Japan, 1085-1090, 2014, 6 pgs. (w/ English Translation).

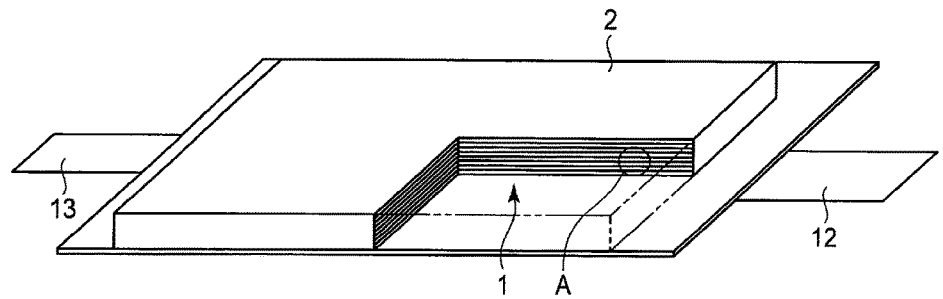
F I G. 3
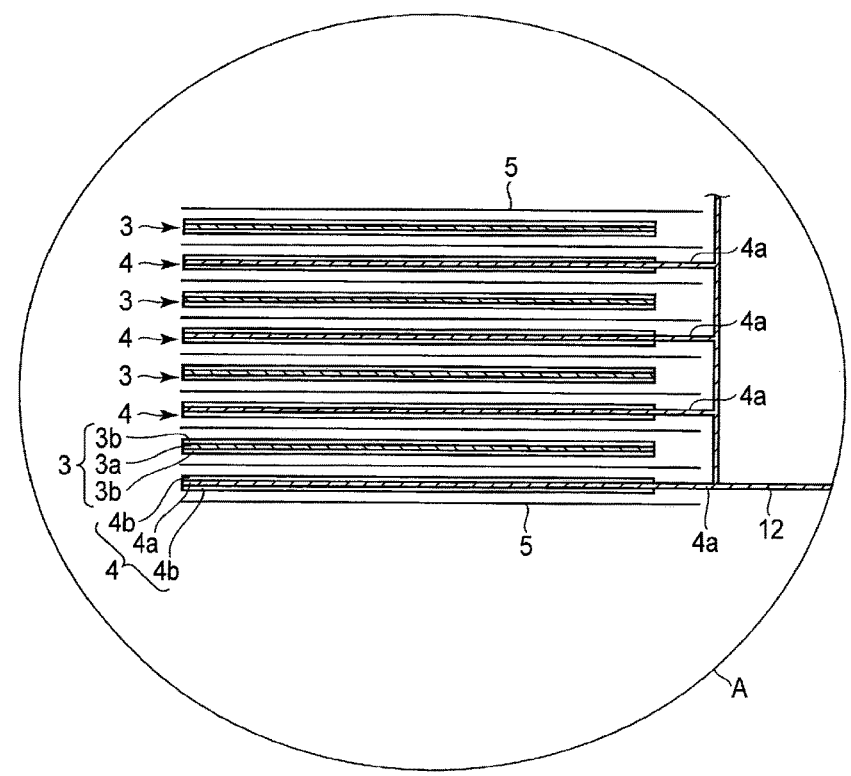
F I G. 4

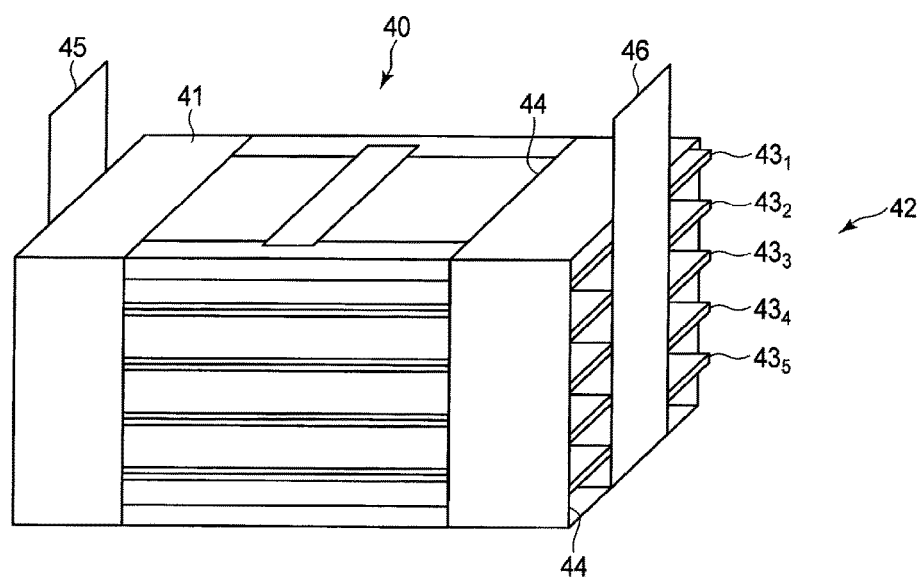
F I G. 6

US 10,424,818 B2

SECONDARY BATTERY, BATTERY MODULE, BATTERY PACK, AND VEHICLE

CROSS-REFERENCE TO RELATED APPLICATION

This application is based upon and claims the benefit of priority from Japanese Patent Application No. 2017-030268, filed Feb. 21, 2017, the entire contents of which are incorporated herein by reference.

FIELD

Embodiments of the present invention relate to a secondary battery, a battery module, a battery pack and a vehicle.

BACKGROUND

A nonaqueous electrolyte battery in which a lithium metal, a lithium alloy, a lithium compound or a carbonaceous material is used for a negative electrode is expected as a high energy density battery, and active research and development have been conducted. A lithium ion secondary battery comprising a positive electrode containing $LiCoO_2$ or $LiMn_2O_4$ as an active material and a negative electrode containing a carbonaceous material that allows lithium ions to be inserted and extracted has been widely put to practical use for a portable device.

In the case of installing the battery in a vehicle such as an automobile or a train, it is preferable that the positive and negative electrodes are formed of a material excellent in chemical and electrochemical stability, in strength, and in corrosion resistance in view of storage performance in high-temperature environments (at not less than 60° C.), cycle performance, and reliability of high power over a long time. Further, high performance in cold climates, high-output performance in a low-temperature environment (−40° C.), and long life performance are required. On the other hand, although a nonvolatile and noncombustible electrolytic solution has been developed as a nonaqueous electrolyte from the viewpoint of enhancing safety performance, a battery including the electrolytic solution has not yet been put to practical use because output characteristics, low-temperature performance, and long life performance are reduced.

As described above, when the lithium ion secondary battery is installed in a vehicle or the like, there is a problem in high-temperature durability and low-temperature output performance. Thus, it is difficult to install the lithium ion secondary battery on an engine room of the vehicle in place of a lead storage battery.

Since an electrolytic solution of the lithium ion secondary battery is used at a high voltage of 2 V to 4.5 V, an aqueous solution-based electrolytic solution is not used in the electrolytic solution of the lithium ion secondary battery, and a nonaqueous electrolytic solution in which lithium salt is dissolved in an organic solvent is used. It has been considered to improve a composition of the nonaqueous electrolytic solution and thereby improve large current discharge performance and cycle life performance. However, since ion conductivity of the nonaqueous electrolytic solution is lower than that of the aqueous solution-based electrolytic solution, it is difficult to lower the resistance of a battery. Since an organic solvent is used, high temperature decomposition is likely to occur, and since heat stability is poor, high-temperature cycle life performance is lowered. Thus, although a solid electrolyte has been considered as a non-aqueous electrolyte, since the ion conductivity of the non-aqueous electrolyte is further lowered, it is difficult to improve large current discharge performance.

BRIEF DESCRIPTION OF THE DRAWINGS

FIG. 3 is a partially cutout perspective view of the secondary battery of the embodiment;
FIG. 4 is an enlarge cross-sectional view of an A portion of FIG. 3;
FIG. 6 is a perspective view of an example of a battery pack of the embodiment.

DETAILED DESCRIPTION

Figure 1:
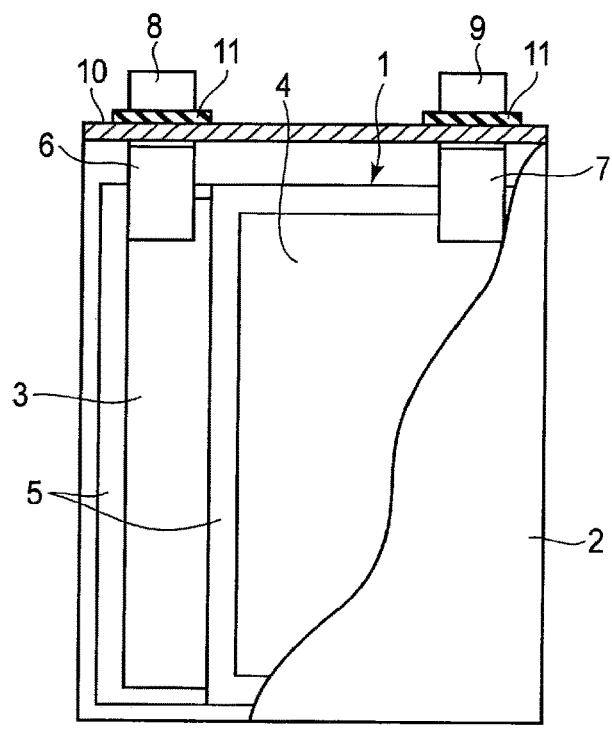
FIG. 1 is a partially cutout cross-sectional view of a secondary battery of an embodiment.

According to one embodiment, a secondary battery including a positive electrode, a negative electrode, and an aqueous electrolyte is provided. The negative electrode contains titanium-containing oxide. The aqueous electrolyte contains a sodium ion having a concentration of 3 mol/L or more and at least one type of first anion selected from the group consisting of $[N(FSO_2)_2]^-$, $SO_3^{2-}$, $S_2O_3^{2-}$ and $SCN^-$.

Another embodiment provides a battery module and a battery pack including the secondary battery according to the embodiment. Still another embodiment provides a vehicle including the battery pack according to the above embodiment.

First Embodiment

According to the first embodiment, a secondary battery including a positive electrode, a negative electrode containing titanium-containing oxide, and an aqueous electrolyte is provided. The aqueous electrolyte contains cationic specifies containing $Na^+$ ions having a concentration of 3 mol/L or more and anionic species containing one or more first anions selected from the group consisting of $[N(FSO_2)_2]^-$, $SO_3^{2-}$, $S_2O_3^{2-}$ and $SCN^-$.

One or more of the first anions selected from the group consisting of $[N(FSO_2)_2]$, $SO_3^{2-}$, $S_2O_3^{2-}$ and $SCN^-$ are electrochemically stable and neither corrode nor dissolve a current collector. In addition, the first anion has a smaller molecular weight and a higher solubility in an aqueous solvent than an organic anion having a fluoroalkyl group, so that Na ion concentration of the aqueous electrolyte can be 3 mol/L or more. As a result, ion conductivity of the aqueous electrolyte can be improved, so that a hydrogen generation overvoltage can be increased. In addition, the amount of free water molecules in the aqueous electrolyte can be reduced. As the results, since occurrence of hydrogen generation at the negative electrode is reduced, the negative electrode can allow Na ions to be efficiently inserted and extracted, so that the cycle life performance and storage performance of the secondary battery are improved. In addition, since the ion conductivity of the aqueous electrolyte is about 10 times higher than that of a nonaqueous electrolytic solution, large current discharge performance (discharge rate performance) is greatly improved.

When the aqueous electrolyte further contains at least one type of second anion selected from the group consisting of $SO_4^{2-}$, $[N(CF_3SO_2)_2]^-$, $[N(C_2F_5SO_2)_2]^-$ and $CF_3SO_3^-$, the cycle life performance, storage performance and large current discharge performance of the secondary battery can be improved. This is because the second anion can be dissolved in an aqueous solvent such that Na ion has a high concentration of 3 mol/L or more, is electrochemically stable and neither corrodes nor dissolves a current collector. Other anions such as $B[(OCO)_2]_2^-$, $CF_3CO_2^-$, $Cl^-$, $OH^-$, $PO_3^-$, $BO_2^-$, $NO_3^-$, and $NO_2^-$ may be contained.

When the negative electrode contains particles of titanium-containing oxide and a covering material covering at least a portion of the surfaces of the particles and containing a Zn component, the occurrence of hydrogen generation can be remarkably reduced, and the cycle life performance and the storage performance are improved. As the Zn component contained in the covering material, when the covering material contains one or more Zn components selected from the group consisting of a zinc simple substance and zinc compounds (such as ZnO, $ZnO_2$, $Zn(OH)_2$, and $ZnO_2^{2-}$), the occurrence of hydrogen generation can be remarkably reduced, and the cycle life performance and the storage performance are improved.

Titanium-containing oxide may contain at least one kind of titanium oxide represented by a general formula $Li_xTiO_2$ ($0 \leq x \leq 1$) and lithium titanium oxide represented by a general formula $Li_{4+x}Ti_5O_{12}$ (x is $-1 \leq x \leq 3$). In these titanium-containing oxides, a potential range in which $Na^+$ ions are inserted and extracted is in a range of 1 to 2 V vs. Na. The aqueous electrolyte of the embodiment shifts the insertion/extraction potential of $Na^+$ ions to noble side, so that the occurrence of hydrogen generation can be suppressed. Thus, the negative electrode can allow $Na^+$ ions to be efficiently inserted and extracted. In order that $Na^+$ ions are more efficiently inserted in and extracted from the negative electrode, it is preferable that an average primary particle size of the titanium-containing oxide is 1 μm or less, and the BET specific surface area utilizing $N_2$ gas adsorption is 10 m$^2$/g or more. If the average primary particle size or the BET specific surface area is less than this range, the influence of hydrogen generation increases, and reduction in Coulomb efficiency and capacity reduction become conspicuous, which is not preferable.

Hereinafter, the aqueous electrolyte, the negative electrode, and the positive electrode will be described. Incidentally, the secondary battery of the embodiment may be provided with a separator and a container member, and the separator and the container member will also be described.

1) Aqueous Electrolyte

The aqueous electrolyte contains cationic species containing $Na^+$ ions having a concentration of 3 mol/L or more and anionic species containing one or more first anions selected from the group consisting of $[N(FSO_2)_2]^-$, $SO_3^{2-}$, $S_2O_3^{2-}$ and $SCN^-$.

The aqueous electrolyte contains water in a solvent and may be in a liquid or gel form. The liquid aqueous electrolyte includes, for example, an electrolytic solution such as an aqueous solution of Na salt. The aqueous solution of Na salt can have a pH that ranges from weakly acidic to weakly alkaline. Examples of the gel aqueous electrolyte include a composite of an aqueous solution of Na salt and a polymer material. Examples of the polymer material include polyvinylidene fluoride (PVdF), polyacrilonitrile (PAN), and polyethyleneoxide (PEO)

The sodium ion concentration of the aqueous electrolyte is 3 mol/L or more, preferably 4 mol/L or more. If the sodium ion concentration is too high, the viscosity of the aqueous electrolyte increases, and the ion conductivity of the aqueous electrolyte decreases. Thus, the sodium ion concentration is preferably 10 mol/L or less, more preferably 8 mol/L or less.

The cation species may include other cations such as lithium ions.

Among the first anions, preferred is $[N(FSO_2)_2]^-$ and/or $S_2O_3^{2-}$. According to these, an aqueous electrolyte having high Na ion concentration and low viscosity can be obtained.

The proportion (mol %) of the first anion in the anionic species is preferably 50 mol % or more. The proportion of the first anion in the anionic species can be 100 mol %.

The aqueous electrolyte may further contain at least one type of second anion selected from the group consisting of $SO_4^{2-}$, $[N(CF_3SO_2)_2]^-$, $[N(C_2F_5SO_2)_2]^-$ and $CF_3SO_3^-$. Among the second anions, preferred is $[N(CF_3SO_2)_2]^-$. By combining the $[N(CF_3SO_2)_2]^-$ anion and the first anion, an aqueous electrolyte excellent in ion conductivity can be obtained.

The molar ratio of the first anion to the second anion is preferably in a range of 1:1 to 5:1, more preferably in a range of 1:1 to 3:1.

The aqueous electrolyte may contain one or two or more kinds of other anions such as $B[(OCO)_2]_2^-$, $CF_3CO_2^-$, $Cl^-$, $OH^-$, $PO_3^-$, $BO_2^-$, $NO_3^-$, and $NO_2^-$.

The aqueous electrolyte may contain one or two or more kinds of lithium salts. Examples of Li salt include those containing a $Li^+$ cation and an anion containing an S element. Examples of the anion containing the S element include anions represented by $[N(FSO_2)_2]^-$, $[N(CF_3SO_2)_2]^-$, $[N(C_2F_5SO_2)_2]^-$, $CF_3SO_3^-$, $SO_4^{2-}$, $SO_3^{2-}$, $S_2O_3^{2-}$, and $SCN^-$. One or two or more kinds of anions may be used. By converting an aqueous electrolyte into a mixed aqueous electrolyte containing a lithium salt and Na ions, it is possible to improve the ion conductivity and reduce the viscosity, and the battery rate performance is improved. The $Li^+$ cation concentration in the aqueous electrolyte is preferably from 1 mol/L to 3 mol/L.

The liquid aqueous electrolyte is prepared, for example, by dissolving Na salt in an aqueous solvent such that $Na^+$ ion concentration is in a range of from 3 mol/L to 10 mol/L. An alkaline aqueous solution having a pH value of 7 or more can be obtained by adding an appropriate amount of LiOH to an obtained sodium solution.

The aqueous solvent is a solvent containing water. Examples of solvents other than water include water-soluble organic solvents. Examples of the water-soluble organic solvent include γ-butyrolactone, acetonitrile, alcohols, N-methylpyrrolidone (NMP), dimethylacetamide, dimethyl sulfoxide, and tetrahydrofuran. One or two or more kinds of solvents may be contained in the aqueous solvent. The content of the solvent other than water in the aqueous solvent is desirably set to 20% by weight or less.

The concentration of sodium ions in the aqueous electrolyte, the concentration of the anionic species and the concentration of the cationic species are measured by the following method. A secondary battery is exploded in a glove box filled with argon to take out an electrode group therefrom. The aqueous electrolyte is separated from the taken-out electrode group by using a centrifugal separator. The sodium ion concentration and cationic species of the collected aqueous electrolyte are measured by atomic absorption spectrometry. The anionic species are measured by ion chromatography.

In the aqueous electrolyte, the amount of an aqueous solvent is preferably 1 mol or more per 1 mol of salt as a solute. In a further preferred embodiment, the amount of the aqueous solvent is 3.5 mol or more per 1 mol of the salt as a solute.

Whether water is contained in the aqueous electrolyte can be confirmed by GC-MS (Gas Chromatography-Mass Spectrometry) measurement. In calculation of salt concentration and water content in the aqueous electrolyte, measurement can be performed by ICP (Inductively Coupled Plasma) emission analysis or the like, for example. The molar concentration (mol/L) can be calculated by taking a prescribed amount of the aqueous electrolyte and calculating the concentration of contained salt. Further, the number of moles of a solute and a solvent can be calculated by measuring the specific gravity of the aqueous electrolyte.

2) Negative Electrode

The negative electrode includes a negative electrode current collector and a negative electrode layer (negative electrode active material-containing layer) supported on one side or both sides of the current collector and containing an active material, an electro conductive agent, and a binder.

As the negative electrode current collector, it is preferable to use a foil, a porous body, or a mesh. The foil, porous body and mesh may made of a metal such as zinc, nickel, stainless steel, iron, copper, aluminum, and titanium. Especially preferred is a foil made of galvanized aluminum, iron, stainless steel, and nickel. The negative electrode current collector may contain one or two or more material components.

The thickness of the negative electrode current collector can be in a range of from 5 μm to 20 μm.

The negative electrode active material contains one or two or more kinds of titanium-containing oxides. The titanium-containing oxide can allow $Na^+$ ions to be inserted in and extracted from. Examples of the titanium-containing oxides include lithium titanium oxide, titanium oxide, niobium titanium oxide, and sodium niobium titanium oxide.

The insertion/extraction potential of $Na^+$ ions of the titanium-containing oxide is desirably in a range of from 1 V to 3 V based on Na potential. It is preferable to select one or more selected from the group consisting of lithium titanium oxide, titanium oxide, niobium titanium oxide, sodium niobium titanium oxide, in which the insertion/extraction potential of $Na^+$ ions is within the above range.

Examples of lithium titanium oxides include lithium titanium oxide having a spinel structure (for example, a general formula $Li_{4+x}Ti_5O_{12}$ (x is $-1 \leq c \leq 3$)), lithium titanium oxide having a ramsdellite structure (for example, $Li_{2+x}Ti_3O_7$ ($-1 \leq x \leq 3$)), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$).

Examples of titanium oxides include titanium oxide having a monoclinic structure, titanium oxide having a rutile structure, and titanium oxide having an anatase structure. In the titanium oxide having each crystal structure, the composition before charging can be represented by $TiO_2$, and the composition after charging can be represented by $Li_xTiO_2$ (x is $0 \leq x \leq 1$). In the titanium oxide having a monoclinic structure, the structure before charging can be represented as $TiO_2$ (B).

Examples of niobium titanium oxides include niobium titanium oxide represented by $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma < 0.3$, and M is at least one kind of element selected from the group consisting of Fe, V, Mo, and Ta).

Examples of sodium niobium titanium oxides include Na-containing niobium titanium composite oxide having an orthorhombic structure and represented by a general formula $Li_{2+v}Na_{2-w}M1_xTi_{6-y-z}Nb_yM2_zO_{14+\delta}$ ($0 \leq v \leq 4$, $0 < w < 2$, $0 \leq x < 2$, $0 < y \leq 6$, $0 \leq z < 3$, $-0.5 \leq \delta \leq 0.5$, M1 includes at least one selected from Cs, K, Sr, Ba, and Ca, and M2 includes at least one selected from Zr, Sn, V, Ta, Mo, W, Fe, Co, Mn, and Al).

Preferable examples of titanium-containing oxides include lithium titanium oxide having a spinel structure. The lithium titanium oxide having a spinel structure can reduce a change in volume due to a charge/discharge reaction.

A negative electrode active material is contained in the form of particles in a negative electrode active material-containing layer. Negative electrode active material particles may be independent primary particles, secondary particles as agglomerates of primary particles, or a mixture of the independent primary particles and the secondary particles. The shape of particles is not limited particularly and may be, for example, a spherical shape, an elliptical shape, a flat shape, or a fibrous shape.

An average particle diameter of secondary particles of a negative electrode active material is preferably not less than 5 μm. A more preferable range is from 7 μm to 20 μm. If the average particle size is in this range, the hydrogen generation suppression effect can be enhanced.

A negative electrode active material in which the average particle size of secondary particles is not less than 5 μm is obtained by the following method, for example. An active-material raw material is reacted and synthesized to produce an active material precursor having an average particle size of not more than 1 μm. After that, the precursor is applied to a heat treatment and then ground using a grinder such as a ball mill and a jet mill. Then, in heat treatment, an active material precursor is aggregated to be grown to secondary particles having a large particle size.

An average particle size of primary particles of a negative electrode active material is desirably not more than 1 μm. Consequently, a diffusion distance of sodium ions inside an active material is reduced, and a specific surface area increases. Thus, excellent high input performance (rapid charge) is obtained. The lower limit of the average particle size can be 0.001 μm. A more preferable average particle size is from 0.1 μm to 0.8 μm.

In the negative electrode active material particles, it is preferable that the average primary particle size is 1 μm or less, and the specific surface area measured with a BET method using $N_2$ absorption is in a range of from 10 $m^2/g$ to 200 $m^2/g$. The reason for specifying the specific surface area within the above range will be described. Setting the specific surface area to 10 $m^2/g$ or more is preferable to suppress generation of hydrogen from the negative electrode and also contributes to suppression of interface resistance of the negative electrode, so that output characteristics and charge-and-discharge cycle characteristics can be improved. By setting the specific surface area to 200 $m^2/g$ or less, the amount of the binder contained in the negative electrode active material-containing layer can be reduced, and a high electrode density can be obtained, so that it is possible to increase capacity and to suppress an increase in resistance. A more preferable range of the specific surface area is from 15 $m^2/g$ to 150 $m^2/g$.

It is preferable that at least a portion of the surfaces of particles of titanium-containing oxide is covered with a covering material containing at least one kind of element (hereinafter referred to as a first element) selected from the group consisting of B, P, Al, La, Zr, Ge, Ti, Zn, Sn, Ga, Pb, In, Bi and Tl. Consequently, it is possible to have $Na^+$ ions to be smoothly inserted in and extracted from the negative electrode while significantly suppressing the hydrogen generation, and it is possible to improve the large current discharge performance of the battery. Elements such as Ga, In, Bi, Tl, Sn, Pb, Al, Zn or Ti are excellent in increasing hydrogen generation overvoltage. The particles may be primary particles, secondary particles, or a mixture of secondary particles and primary particles. Each element may take any form including a simple substance, a compound, and an alloy. Each element may be present in a negative electrode in a plural of forms such as a simple substance and a compound.

Examples of compounds of the first element include an oxide of the first element and a hydroxide of the first element. Examples of the oxide of the first element include a solid electrolyte having no electron conductivity and having $Na^+$ ion conductivity, zinc oxide (such as ZnO and $ZnO_2$), alumina (such as $Al_2O_3$), zirconia (such as $ZrO_2$), boron oxide (such as $B_2O_3$), and titanium oxide (such as TiO and $TiO_2$). Zinc oxide can suppress hydrogen generation, and cycle life performance and storage performance are improved. Covering materials containing zinc oxide are preferred.

Examples of alloys of the first element include a Zn-containing alloy, a Bi—In—Pb-based alloy, a Bi—In—Ca-based alloy, and a Bi—In—Al-based alloy. Those alloys can increase the hydrogen generation overvoltage.

The covering material preferably contains a Zn component. Since the covering material containing the Zn component has a high hydrogen overvoltage and functions as a negative electrode active material, hydrogen generation is suppressed, and a high capacity negative electrode can be achieved. Since zinc as metal is excellent in electron conductivity, it can serve as a conductive agent, so that the electron conductivity of a negative electrode can be enhanced. Examples of the Zn component include zinc metal (zinc simple substance), zinc compound, and zinc-containing alloy. Examples of the zinc compound include zinc oxide (such as ZnO and $ZnO_2$), hydrate ion of zinc, zinc hydroxide ($Zn(OH)_2$), and zincate ion ($ZnO_2^{2-}$). When the covering material contains zinc metal, the zinc metal can be changed to zinc oxide (such as ZnO and $ZnO_2$) by charge-discharge reaction.

Covering materials may be in form of layers, granules, membranes, fibers or the like.

The thickness of the covering material is preferably from 0.05 μm to 0.5 μm. By setting the thickness to 0.05 μm or more, hydrogen generation can be suppressed, and the life performance can be improved. By setting the thickness to 0.5 μm or less, it is possible to reduce negative electrode resistance and improve the large current discharge performance. A preferable range of the thickness of the covering material is from 0.06 μm to 0.3 μm. The thickness of the covering material can be measured by observation using a scanning electron microscope (SEM) or a transmission electron microscope (TEM).

Examples of a method of covering at least a portion of the surface of the particles of titanium-containing oxide include a method of adding a simple substance, an alloy or a compound of the first element to the negative electrode, and a method of dissolving a salt of the first element in an aqueous electrolyte. Other examples of the covering method include plating and vapor deposition.

A porosity of a negative electrode (except for a current collector) is preferably in a range of 20 to 50%. Consequently, it is possible to obtain a high-density negative electrode excellent in affinity with an aqueous electrolyte. A more preferable range of the porosity is 25 to 40%.

The density of the negative electrode can be in a range of from 2 $g/cm^3$ to 3 $g/cm^3$.

Examples of the electro conductive agent include carbon materials, such as acetylene black, carbon black, coke, carbon fibers, and graphite, and metal powders such as nickel and zinc. One or two or more kinds of electro conductive agents may be used. Since hydrogen may be generated from a carbon material, it is preferable to use a metal powder as an electro conductive agent. When zinc particles are used in the first element, the zinc particles serve as an electro conductive agent, so that another conductive agent is not required. The zinc particles further function as a negative electrode active material. Thus, when the zinc particles are contained in the first element, hydrogen generation is suppressed, and a high capacity negative electrode excellent in electron conductivity can be achieved.

Examples of the binder include polytetrafluoroethylene (PTFE), fluororubbers, styrene butadiene rubbers, and core/shell binder. One or two or more kinds of binders may be used.

The mixing ratio of the negative electrode active material, the conductive agent, and the binder is preferably set in the range of 80% by weight to 95% by weight for the negative electrode active material, 3% by weight to 18% by weight for the conductive agent, and 2% by weight to 7% by weight for the binder.

The negative electrode is produced by, for example, suspending the negative electrode active material, the conductive agent, and the binder in an appropriate solvent, applying the suspended matter on a current collector, drying, and pressing the current collector by, for example, heat-pressing.

3) Positive Electrode

The positive electrode includes a positive electrode current collector and a positive electrode layer (positive electrode active material-containing layer) supported on one side or both sides of the current collector and containing an active material, an electro conductive agent, and a binder.

As the positive electrode current collector, it is preferable to use a foil, a porous body, or a mesh. The foil, porous body and mesh may be made of a metal such as nickel, stainless steel, iron, copper, aluminum, and titanium.

The thickness of the positive electrode current collector can be in a range of from 5 μm to 20 μm.

As the positive electrode active material, a compound capable of allowing $Na^+$ ions or the like to be inserted in and extracted from is used. Examples of the positive electrode active material include sodium manganese composite oxide, sodium nickel composite oxide, sodium cobalt composite oxide, sodium nickel cobalt manganese composite oxide, sodium iron composite oxide, sodium phosphorus oxide (such as sodium iron phosphate and sodium vanadium phosphate), sodium iron manganese composite oxide, sodium nickel titanium composite oxide, sodium nickel iron composite oxide, and sodium nickel manganese composite oxide.

Preferable examples of the positive electrode active material include iron composite oxides (for example, $Na_yFeO_2$, $0 \leq y \leq 1$), iron manganese composite oxides (for example, $Na_yFe_{1-x}Mn_xO_2$, $0<x<1$, $0 \leq y \leq 1$), nickel titanium composite oxide (for example, $Na_yNi_{1-x}Ti_xO_2$, $0<x<1$, $0 \leq y \leq 1$), nickel iron composite oxide (for example, $Na_yNi_{1-x}Fe_xO_2$, $0<x<1$, $0 \leq y \leq 1$), nickel manganese composite oxide (For example, $Na_yNi_{1-x}Mn_xO_2$, $0<x<1$, $0 \leq y \leq 1$), nickel manganese iron composite oxide (for example, $Na_yNi_{1-x-z}Mn_xFe_zO_2$, $0<x<1$, $0\le y\le 1$, $0<z<1$, $0<1-x-z<1$), and iron phosphate (for example $Na_yFePO_4$, $0\le y\le 1$).

The above-described positive electrode active materials can be changed to Na-containing composite oxide by a charge-discharge reaction.

One or two or more kinds of positive electrode active materials may be used.

Lithium metal oxide capable of allowing lithium ions to be inserted in and extracted from, graphite or a carbon material capable of allowing anionic species to be inserted in and extracted from, and active carbon having a capacity of a capacitor can be used for the positive electrode.

Particles of a positive electrode active material may include independent primary particles, secondary particles as agglomerates of primary particles, or both the independent primary particles and the secondary particles.

An average particle size (average particle diameter) of primary particles of the positive electrode active material is preferably not more than 1 µm and more preferably 0.05 to 0.5 µm. It is preferable that at least a portion of a surface of the particles of the positive electrode active material is covered with a carbon material. The carbon material may take the form of a layer structure, a particle structure, or an aggregate of particles. Examples of the carbon material include acetylene black, carbon black, and graphite.

When the positive electrode active material particles take the form where the secondary particles and the independent primary particles are mixed, the average particle size of the positive electrode active material particles is preferably from 0.8 µm to 15 µm.

Examples of an electro conductive agent used for enhancing electron conductivity and suppressing contact resistance with a current collector include acetylene black, carbon black, and graphite. One or two or more kinds of electro conductive agents may be used.

Examples of a binder for binding an active material and the conductive agent include polytetrafluoroethylene (PTFE) and fluororubbers. One or two or more kinds of binders may be used.

The mixing ratio of the positive electrode active material, the electro conductive agent, and the binder is preferably set in the range of not less than 80% by weight and not more than 95% by weight for the positive electrode active material, not less than 3% by weight and not more than 18% by weight for the conductive agent, and not less than 2% by weight and not more than 7% by weight for the binder. When the mixing ratio of the conductive agent is not less than 3% by weight, the above effect can be exercised. When the mixing ratio of the conductive agent is not more than 18% by weight, decomposition of an aqueous electrolyte on a surface of the conductive agent under high temperature preservation can be reduced. When the mixing ration of the binder is not less than 2% by weight, sufficient electrode strength is obtained, and when the mixing ration of the binder is not more than 7% by weight, an insulating portion of an electrode can be decreased.

The density of the positive electrode can be in a range of from 2.5 g/cm³ to 3.8 g/cm³.

The positive electrode is produced by, for example, suspending the positive electrode active material, the electro conductive agent, and the binder in an appropriate solvent, applying the suspended matter on a positive electrode current collector, drying, and pressing the current collector. A positive electrode pressing pressure is preferably in a range of 0.15 ton/mm to 0.3 ton/mm. If the positive electrode pressing pressure is in this range, it is preferable because adhesion (peel strength) between the positive electrode layer and the positive electrode current collector is enhanced, and, at the same time, the elongation percentage of the positive electrode current collector is not more than 20%.

4) Separator

A separator can be disposed between a positive electrode and a negative electrode or so as to face the positive electrode or the negative electrode. Examples of the separator include nonwoven fabrics, films, and paper.

Examples of materials forming the separator include polyolefin, such as polyethylene and polypropylene, and cellulose. Preferable examples of the separator include nonwoven fabrics containing cellulose fibers and porous films containing polyolefin fibers. The porosity of the separator is preferably not less than 60%. A fiber diameter is preferably not more than 10 µm. When the fiber diameter is not more than 10 µm, an affinity with an electrolyte of the separator is enhanced, so that battery resistance can be reduced. A more preferable range of the fiber diameter is not more than 3 µm. In a cellulose fiber containing nonwoven fabric having a porosity of not less than 60%, impregnation of an electrolyte is good, and high output performance can be exhibited from low temperature to high temperature. The separator does not react with a negative electrode in long term storage of charged battery, float charging, and over-charge, and a short-circuit between the negative electrode and a positive electrode due to dendrite precipitation of lithium metal does not occur. A more preferable range is 62% to 80%.

It is preferable that the separator has a thickness of from 20 µm to 100 µm and a density of from 0.2 g/cm³ to 0.9 g/cm³. If the thickness and the density of the separator are in these ranges, mechanical strength and a reduction in battery resistance can be balanced, so that a high output secondary battery in which an internal short-circuit is suppressed can be provided. Heat shrinkage of the separator under a high temperature environment is small, and good high temperature storage performance can be exhibited.

As the separator, a solid electrolyte may be used. As the solid electrolyte, oxides such as LATP ($Li_{1+x}Al_xTi_{2-x}(PO_4)_3$, $0.1\le x\le 0.4$) having a NASICON structure, amorphous LIPON ($Li_{2.9}PO_{3.3}N_{0.46}$), and garnet type LLZ ($Li_7La_3Zr_2O_{12}$) are preferred.

5) Container Member

As a container member containing a positive electrode, a negative electrode, and a nonaqueous electrolyte, a metal container, a laminate film container, or a resin container, such as a polyethylene container or a polypropylene container, may be used.

As the metal container, a rectangular or cylindrical metal can formed of nickel, iron, stainless steel, or the like may be used.

Each plate thickness of the resin container and the metal container is preferably not more than 1 mm and more preferably not more than 0.5 mm. A more preferable range is not more than 0.3 mm. The lower limit value of the plate thickness is desirably 0.05 mm.

Examples of laminate films include a multilayer film comprising a resin layer and a metal layer covered with the resin layer. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) may be used. A preferable range of a thickness of the laminate film is not more than 0.5 mm. A more preferable range is not more than 0.2 mm. The lower limit value of the thickness of the laminate film is desirably 0.01 mm.

The secondary battery according to the embodiments is applicable to secondary batteries in various forms such as a rectangular form, a cylindrical form, a flat form, a thin form, and a coin form. The secondary battery according to the embodiments is preferably a secondary battery having a bipolar structure. Consequently, one secondary battery having the bipolar structure can be used for a high voltage battery instead of a plural of series batteries.

An example of the secondary battery according to the embodiment will be described with reference to FIGS. 1, 2, 3, and 4.

Figure 2:
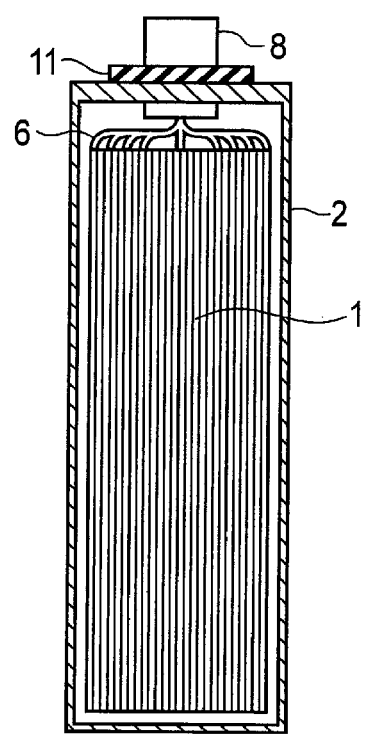
FIG. 2 is a side view of the battery of FIG. 1.

FIGS. 1 and 2 show an example of the secondary battery using a metal container.

An electrode group 1 is stored in a rectangular tubular metal container 2. The electrode group 1 has a structure formed by spirally winding a positive electrode 3 and a negative electrode 4 with a separator 5 interposing therebetween so as to form a flat shape. The aqueous electrolyte (not shown) is held by electrode group 1. As shown in FIG. 2, a strip-shaped positive electrode lead 6 is electrically connected to each of a plural of portions at an end of the positive electrode 3 located on an end face of the electrode group 1. A strip-shaped negative electrode lead 7 is electrically connected to each of a plural of portions at an end of the negative electrode 4 located on the end face. The plural of positive electrode leads 6 are bundled, and in this state, electrically connected to a positive electrode tab 8. A positive electrode terminal is formed from the positive electrode leads 6 and the positive electrode tab 8. In addition, the negative electrode leads 7 are bundled, and in this state, connected to a negative electrode tab 9. A negative electrode terminal is formed from the negative electrode leads 7 and the negative electrode tab 9. A sealing plate 10 made of a metal is fixed to the opening portion of the metal container 2 by welding or the like. The positive electrode tab 8 and the negative electrode tab 9 are extracted to the outside from outlet holes formed in the sealing plate 10, respectively. The inner surface of each outlet hole of the sealing plate 10 is coated with an insulating member 11 to avoid a short circuit caused by contact between the positive electrode tab 8 and the sealing plate 10, or by contact between the negative electrode tab 9 and the sealing plate 10.

FIGS. 3 and 4 show an example of a secondary battery including a case member made of a laminated film.

The stacked electrode group 1 is stored in the sack-shaped container 2 made of a laminated film including a metal layer interposing between two resin films. The aqueous electrolyte is held by the electrode group 1. As shown in FIG. 4, the stacked electrode group 1 has a structure formed by alternately stacking the positive electrodes 3 and the negative electrodes 4 with the separators 5 interposing therebetween. A plural of positive electrodes 3 exist, each of which includes a current collector 3a and positive electrode active material-containing layers 3b formed on both surfaces of the current collector 3a. A plural of negative electrodes 4 exist, each of which includes a current collector 4a and negative electrode active material-containing layers 4b formed on both surfaces of the current collector 4a. The current collector 4a of each negative electrode 4 has one side projecting from the positive electrodes 3. Each projecting current collector 4a is electrically connected to a strip-shaped negative electrode terminal 12. The distal end of a strip-shaped negative electrode terminal 12 is extracted from the container 2 to the outside. Although not illustrated, in the current collector 3a of each positive electrode 3, a side located on a side opposite to the projecting sides of the current collectors 4a projects from the negative electrodes 4. Each current collector 3a projecting from the negative electrodes 4 is electrically connected to a strip-shaped positive electrode terminal 13. The distal end of the strip-shaped positive electrode terminal 13 is located on the side opposite to the negative electrode terminal 12 and extracted from the side of the container 2 to the outside. The separators 5 are located on both outermost layers of the electrode group 1. The separator 5 on one outermost layer faces the positive electrode 3, and the separator 5 on the other outermost layer faces the negative electrode 4.

The secondary battery shown in FIGS. 1, 2, 3, and 4 can be provided with a rupture member to discharge hydrogen gas generated in the container to the outside. As the rupture member, either a reset type that operates when the internal pressure exceeds a set value and functions as a sealing plug when the internal pressure lowers, or a non-reset type that cannot recover the function as a sealing plug once it operates can be used. The secondary battery shown in FIGS. 1, 2, 3, and 4 is a close type. However, if a circulation system configured to return hydrogen gas to water is provided, an open system can be employed.

Since the secondary battery of the first embodiment contains the aqueous electrolyte containing the cation species containing $Na^+$ ions having a concentration of 3 mol/L or more and the anionic species containing one or more first anions selected from the group consisting of $[N(FSO_2)_2]^-$, $SO_3^{2-}$, $S_2O_3^{2-}$ and $SCN^-$, the ion conductivity of the aqueous electrolyte is improved, hydrogen generation is suppressed, and sodium ions can be efficiently inserted in and extracted from the negative electrode. As a result, the cycle life performance, the storage performance, and the large current discharge performance of the secondary battery including an aqueous electrolyte can be enhanced.

Second Embodiment

According to a second embodiment, a battery module in which a secondary battery is a single battery can be provided. The secondary battery of the first embodiment may be used as the secondary battery of the second embodiment.

Examples of the battery module include a battery module including, as a structural unit, a plural of single batteries electrically connected in series or parallel and a battery module including a unit constituted of a plural of single batteries electrically connected in series or a unit constituted of a plural of single batteries electrically connected in parallel. In the battery module, it is also possible to combine plural kinds of single batteries or plural kinds of units.

The battery module may be contained in a housing. As the housing, a metal can formed of aluminum alloy, iron, stainless steel, or the like or a plastic container may be used, for example. A plate thickness of the container is desirably not less than 0.5 mm.

Examples of an embodiment in which a plural of secondary batteries are electrically connected in series or parallel include an embodiment in which a plural of secondary batteries each provided with a container are electrically connected in series or parallel and an embodiment in which a plural of electrode groups contained in a common housing are electrically connected in series or parallel. As a specific example of the former embodiment, positive electrode terminals and negative electrode terminals of a plural of secondary batteries are connected by a metal bus bar (formed of aluminum, nickel, or copper, for example). As a specific example of the latter embodiment, a plural of electrode groups in a state of being electrochemically insulated by a partition are contained in one housing, and these electrode groups are electrically connected in series. When the number of batteries electrically connected in series is in the range of 5 to 7, voltage compatibility with a lead storage battery is improved. In order to further improve the voltage compatibility with the lead storage battery, it is preferable that five or six single batteries are connected in series.

Figure 5:
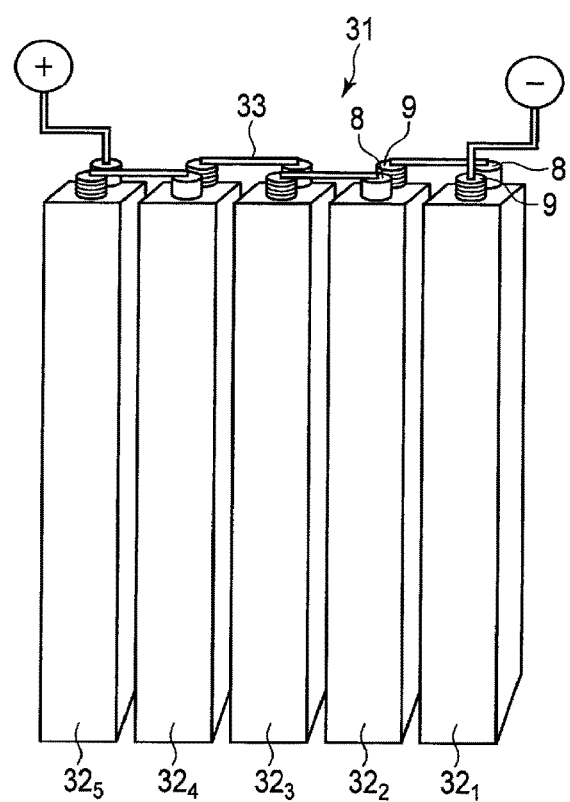
FIG. 5 is a perspective view of an example of a battery module of the embodiment.

An example of a battery module will be described with reference to FIG. 5. A battery module 31 shown in FIG. 5 includes, as single batteries, a plurality of rectangular secondary batteries (for example, FIGS. 1 and 2) $32_1$ to $32_5$ according to the first embodiment. A positive electrode tab 8 of the battery $32_1$ and a negative electrode tab 9 of the battery $32_2$ located adjacent to the battery $32_1$ are electrically connected by a lead 33. In addition, the positive electrode tab 8 of the battery $32_2$ and the negative electrode tab 9 of the battery $32_3$ located adjacent to the battery $32_2$ are electrically connected by the lead 33. The batteries $32_1$ to $32_5$ are thus electrically connected in series.

Since the battery module of the second embodiment includes the secondary battery of the first embodiment, a battery module excellent in cycle life performance, storage performance, and large current discharge performance can be achieved. The secondary battery of the first embodiment is excellent in compatibility with a lead storage battery. Thus, a battery module including five secondary batteries connected in series can be used as an alternative power supply for a lead storage battery.

Third Embodiment

According to the third embodiment, it is possible to provide a battery pack including at least one secondary battery of the first embodiment and a circuit portion for controlling charge/discharge of the secondary battery. A plural of secondary batteries can be electrically connected in series, in parallel, or in combination thereof. When a battery module is formed of a plural of secondary batteries, the battery module of the second embodiment may be used.

In a battery pack, a circuit portion may be connected to a secondary battery before the battery pack is installed in a vehicle such as an automobile or an electronic device; however, the battery pack of the embodiment includes a battery pack in which a circuit portion of a vehicle such as an automobile is connected to a secondary battery. Examples of the circuit portion include a protective circuit. The protective circuit has a function of controlling charge/discharge of the secondary battery. Alternatively, a circuit included in a device (such as an electronic device and an automobile) using a battery pack as a power supply may be used as a protective circuit of the battery pack.

The battery pack may further comprise an external power distribution terminal. The external power distribution terminal is used for outputting a current from a secondary battery to the outside and/or for inputting a current to the secondary battery. In other words, when the battery pack is used as a power supply, a current is supplied to the outside through an external power distribution terminal. When the battery pack is charged, a charging current (including regenerative energy of the motive force of a vehicle such as an automobile) is supplied to the battery pack through an external power distribution terminal.

An example of the battery pack will be described with reference to FIG. 6. A battery pack 40 includes a battery module formed from secondary batteries shown in FIGS. 3 and 4. The battery pack 40 includes a case 41 and a battery module 42 stored in the case 41. The battery module 42 is formed by electrically connecting a plurality of (for example, five) secondary batteries $43_1$ to $43_5$ in series. The secondary batteries $43_1$ to $43_5$ are stacked in the thickness direction. The case 41 has an opening portion 44 in each of the upper portion and the four side surfaces. Side surfaces of the secondary batteries $43_1$ to $43_5$ from which positive and negative electrode terminals project are exposed to the opening portions 44 of the case 41. An output positive electrode terminal 45 of the battery module 42 has a strip shape. One end of the output positive electrode terminal 45 is electrically connected to the positive electrode terminal of one of the secondary batteries $43_1$ to $43_5$, and the other end projects from the opening portion 44 of the case 41 and projects from the upper portion of the case 41. On the other hand, an output negative electrode terminal 46 of the battery module 42 has a strip shape. One end of the output negative electrode terminal 46 is electrically connected to the negative electrode terminal of one of the secondary batteries $43_1$ to $43_5$, and the other end projects from the opening portion 44 of the case 41 and projects from the upper portion of the case 41.

Another example of the battery pack will be described in detail with reference to FIGS. 7 and 8. A plurality of single batteries 51 each formed from a flat secondary battery are stacked such that negative electrode terminals 52 and positive electrode terminals 53 which extend outward face in the same direction, and fastened by an adhesive tape 54 to form a battery module 55. The single batteries 51 are electrically connected in series, as shown in FIG. 8.

A printed wiring board 56 is arranged to face the side surfaces of the single batteries 51 from which the negative electrode terminals 52 and the positive electrode terminals 53 extend. As shown in FIG. 8, a thermistor 57, protective circuit 58, and an external power distribution terminal 59 to an external device are mounted on the printed wiring board 56. Note that an insulating plate (not shown) is attached to the surface of the printed wiring board 56 facing the battery module 55 to avoid unwanted connection to the wires of the battery module 55.

A positive electrode lead 60 is connected to the positive electrode terminal 53 located in the lowermost layer of the battery module 55. The distal end of the positive electrode lead 60 is inserted into a positive electrode connector 61 of the printed wiring board 56 and electrically connected to the positive electrode connector 61. A negative electrode lead 62 is connected to the negative electrode terminal 52 located in the uppermost layer of the battery module 55. The distal end of the negative electrode lead 62 is inserted into a negative electrode connector 63 of the printed wiring board 56 and electrically connected to the negative electrode connector 63. The connectors 61 and 63 are connected to the protective circuit 58 via wires 64 and 65 formed on the printed wiring board 56.

The thermistor 57 detects the temperature of each single battery 51 and transmits the detection signal to the protective circuit 58. The protective circuit 58 can disconnect a positive wire 66a and a negative wire 66b between the protective circuit 58 and the external power distribution terminal 59 to an external device under a predetermined condition. The predetermined condition is that, for example, the temperature detected by the thermistor 57 is a predetermined temperature or more. Alternatively, the predetermined condition is detection of over-charge, over-discharge, or overcurrent of the single battery 51. The detection of over-charge or the like is done for each single battery 51 or the battery module 55. If the detection is performed for each single battery 51, a battery voltage may be detected, or a positive electrode potential or negative electrode potential may be detected. In the latter case, a lithium electrode to be used as a reference electrode is inserted into each single battery 51. In FIGS. 7 and 8, a wire 67 used to detect a voltage is connected to each single battery 51, and a detection signal is transmitted to the protective circuit 58 via the wire 67.

A protective sheet 68 made of rubber or resin is arranged on each of three side surfaces of the battery module 55 except the side surface from which the positive electrode terminals 53 and the negative electrode terminals 52 project.

The battery module 55 is stored in a storage container 69 together with the protective sheets 68 and the printed wiring board 56. That is, the protective sheets 68 are arranged on both inner surfaces of the storage container 69 in the long-side direction and on an inner surface in the short-side direction. The printed wiring board 56 is arranged on the inner surface on the opposite side in the short-side direction. The battery module 55 is located in a space surrounded by the protective sheets 68 and the printed wiring board 56. A lid 70 is attached to the upper surface of the storage container 69.

Note that to fix the battery module 55, a heat-shrinkable tape may be used in place of the adhesive tape 54. In this case, the protective sheets are arranged on both side surfaces of the battery module, and the heat-shrinkable tape is wrapped and shrunk by heat to bind the battery module.

Figure 7:
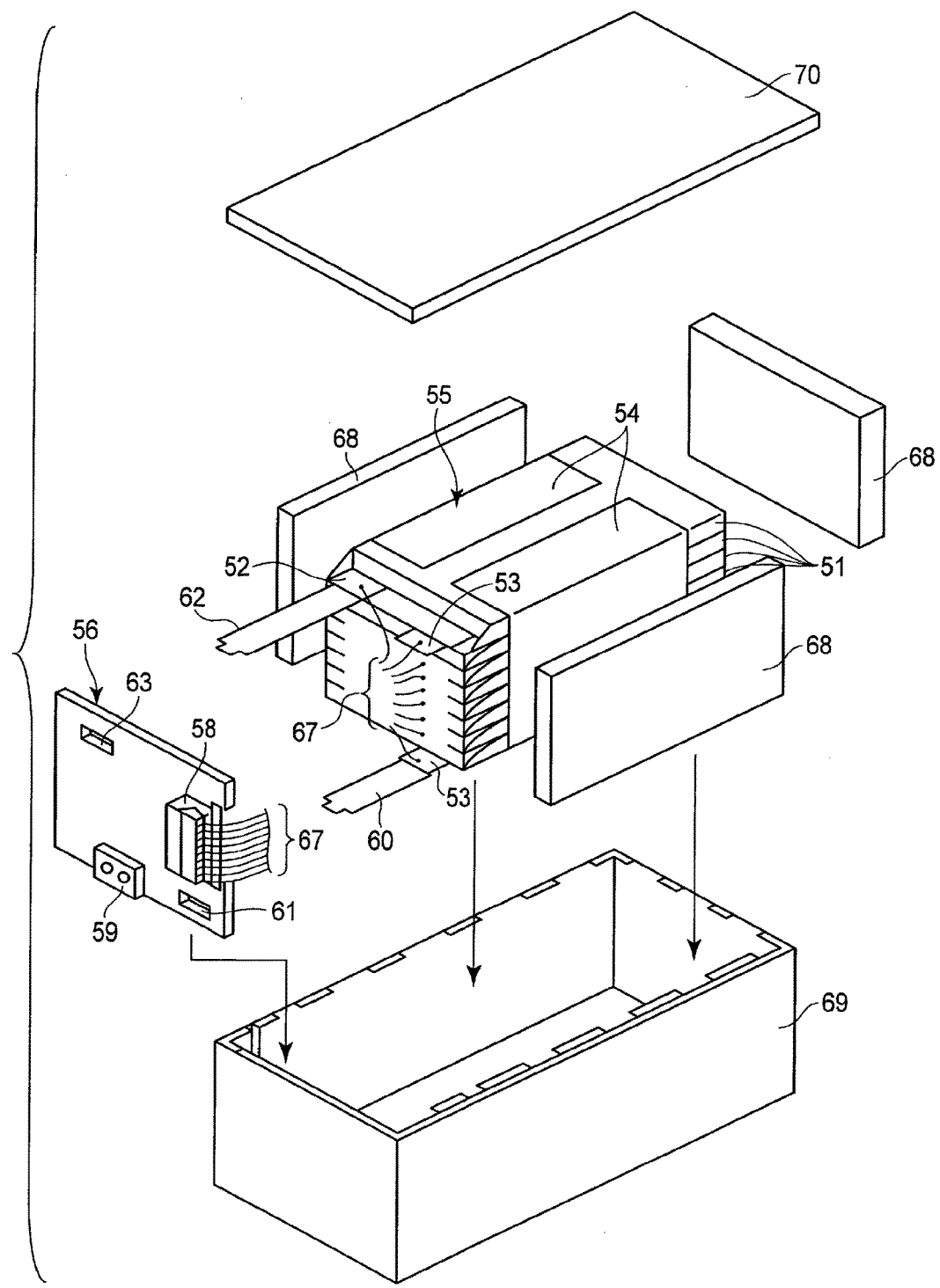
FIG. 7 is an exploded perspective view of another example of a battery pack of the embodiment.
Figure 8:
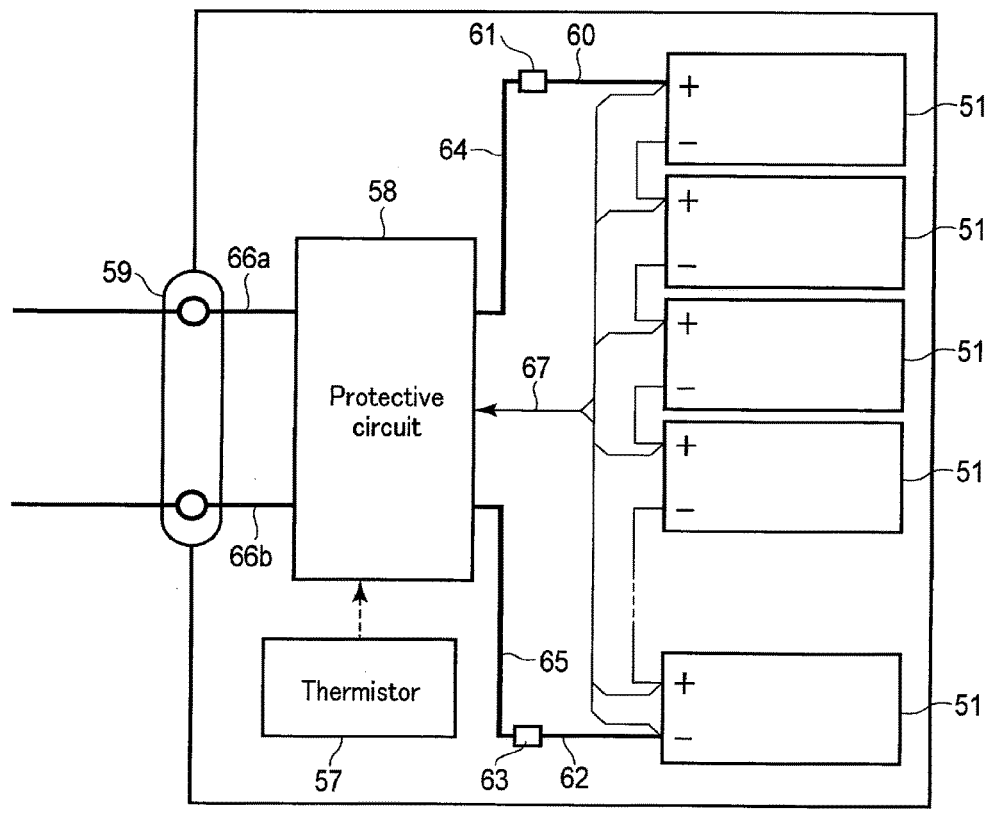
FIG. 8 is a block diagram showing an electric circuit of the battery pack of FIG. 7.

FIGS. 7 and 8 show a form in which the single batteries 51 are connected in series. However, the single batteries may be connected in parallel to increase the battery capacity. Assembled battery packs may be connected in series and in parallel.

In FIGS. 7 and 8, an embodiment in which the single batteries 51 are connected in series is described, they may be connected in parallel, for increasing a battery capacity. Assembled battery packs may be connected in series or in parallel.

The embodiments of the battery pack may be appropriately altered depending on the application thereof. The application of the battery pack may include applications in which charging/discharging at high current is desired. Specific examples include a power supply battery for a digital camera, a stationary battery, and a vehicle battery. Examples of vehicles in vehicle batteries include two- or four-wheel hybrid electric vehicles, two- or four-wheel electric vehicles, motor-assisted bicycles, and railway vehicles (railway cars).

In a vehicle such, as an automobile including the battery pack according to the third embodiment, the battery pack is configured to use regenerative energy of the motive force of the vehicle, for example.

Figure 9:
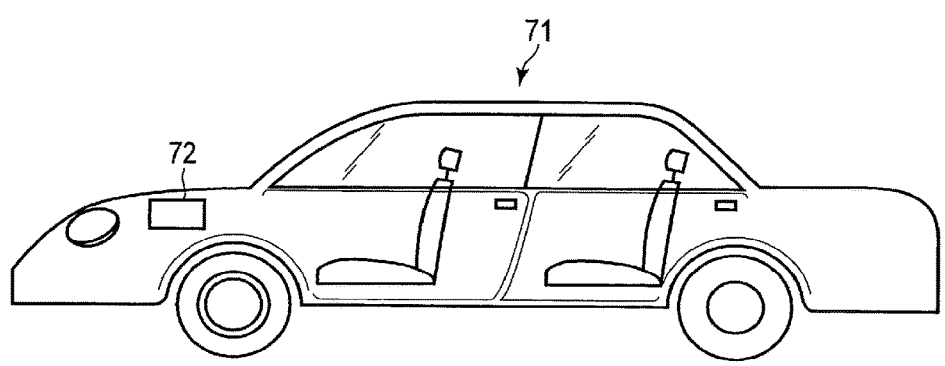
FIG. 9 is a schematic diagram of an example of a vehicle including the secondary battery of the embodiment.

FIG. 9 is a cross-sectional view schematically showing an example of a vehicle according to the third embodiment.

A vehicle 71, shown in FIG. 9 includes a vehicle body and a battery pack 72 according to the embodiment.

The battery pack 72 is installed in an engine compartment located at the front of the vehicle body. The location of installing the battery pack 72 is not particularly limited. The battery pack 72 may be installed in rear sections of the vehicle body, or under a seat. The battery pack 72 may be used as a power source of the vehicle 71. The battery pack 72 can also recover regenerative energy of motive force of the vehicle 71.

Figure 10:
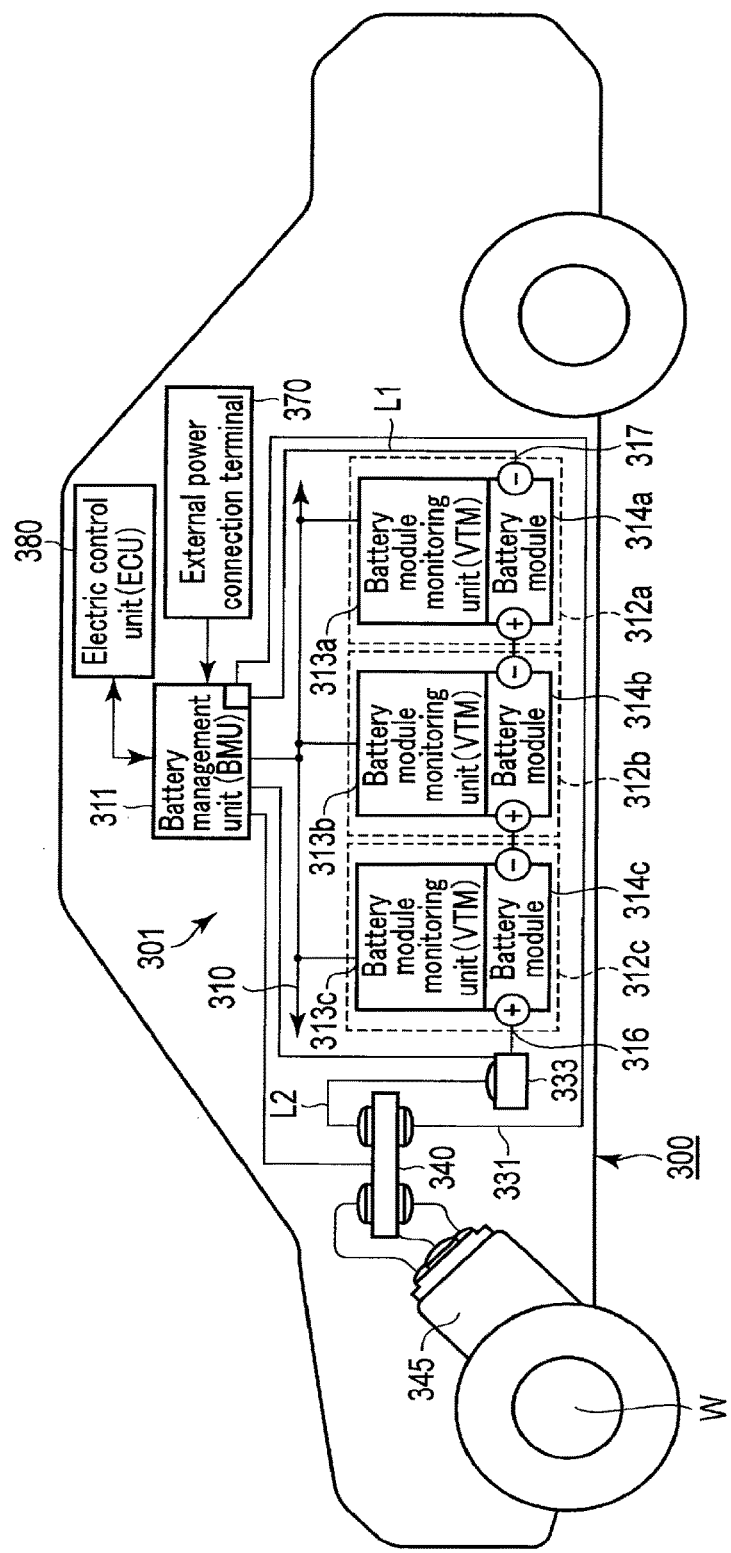
FIG. 10 is a view schematically showing another example of the vehicle according to the embodiment.

FIG. 10 is a view schematically showing an example of the vehicle according to the embodiment. A vehicle 300, shown in FIG. 10, is an electric automobile.

The vehicle 300, shown in FIG. 10, includes a vehicle body, a vehicle power source 301, a vehicle ECU (electric control unit) 380, which is a master controller of the vehicle power source 301, an external terminal (an external power connection terminal) 370, an inverter 340, and a drive motor 345.

The vehicle 300 includes the vehicle power source 301, for example, in the engine compartment, in the rear sections of the automobile body, or under a seat. In FIG. 10, the position of the vehicle power source 301 installed in the vehicle 300 is schematically shown.

The vehicle power source 301 includes plural (for example, three) battery packs 312a, 312b and 312c, BMU (a battery management unit) 311, and a communication bus 310.

The three battery packs 312a, 312b and 312c are electrically connected to each other in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack.

Each of the battery modules 314a to 314c includes plural single batteries connected to each other in series. At least one of the plural single batteries is the secondary battery according to the embodiment. The battery modules 314a to 314c each perform charging and discharging through a positive electrode terminal 316 and a negative electrode terminal 317.

In order to collect information concerning security of the vehicle power source 301, the battery management unit 311 performs communication with the battery module monitoring units 313a to 313c and collects information such as voltages or temperatures of the single batteries included in the battery modules 314a to 314c included in the vehicle power source 301.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each single battery in the battery modules 314a to 314c based on communications from the battery management unit 311. It is possible, however, to measure the temperatures only at several points per battery module, and the temperatures of all of the single batteries need not be measured.

The vehicle power source 301 may also have an electromagnetic contactor (for example, a switch unit 333 shown in FIG. 10) for switching connection between the positive electrode terminal and the negative electrode terminal. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal supplied to a coil located near the switch element.

The inverter 340 converts an inputted DC (direct current) voltage to a three-phase AC (alternate current) high voltage for driving a motor. Three-phase output terminal(s) of the inverter 340 is connected to each three-phase input terminal of the drive motor 345. The inverter 340 controls an output voltage based on control signals from the battery management unit 311 or the vehicle ECU 380, which controls the whole operation of the vehicle.

The drive motor 345 is rotated by electric power supplied from the inverter 340. The rotation is transferred to an axle and driving wheels W, for example, through a differential gear unit.

The vehicle 300 also includes a regenerative brake mechanism, though not shown. The regenerative brake mechanism rotates the drive motor 345 when the vehicle 300 is braked, and converts kinetic energy into regenerative energy, as electric energy. The regenerative energy, recovered in the regenerative brake mechanism, is inputted into the inverter 340 and converted to direct current. The direct current is inputted into the vehicle power source 301.

One terminal of a connecting line L1 is connected through a current detector (not shown) in the battery management unit 311 to the negative electrode terminal 317 of the vehicle power source 301. The other terminal of the connecting line L1 is connected to a negative electrode input terminal of the inverter 340.

One terminal of a connecting line L2 is connected through the switch unit 333 to the positive electrode terminal 316 of the vehicle power source 301. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 301, such as a remaining capacity of the vehicle power source 301, are transferred between the battery management unit 311 and the vehicle ECU 380 through communication lines.

In a vehicle including the secondary battery according to the embodiment, each of the battery packs 312a, 312b, and 312c is excellent in cycle life performance, storage performance, and large current discharge performance, and therefore, a vehicle having excellent charge/discharge performance and high reliability can be obtained. Further, since each of the battery packs has a reasonable cost and is highly safe, it is possible to reduce the cost of the vehicle and improve the safety.

Since the battery pack of the third embodiment includes the secondary battery of the first embodiment, a battery pack excellent in cycle life performance, storage performance, and large current discharge performance can be achieved. Thus, according to the embodiment, it is possible to provide a battery module and a battery pack suitable as an alternative power supply for a lead battery used as a starter power supply for a vehicle or as an onboard secondary battery to be installed in a hybrid car.

EXAMPLES

Hereinafter, although examples of the embodiments will be described in detail with reference to the drawings, this embodiments are not limited to the following examples.

Example 1

Secondary particles of sodium nickel manganese iron composite oxide (NaNi$_{1/3}$Mn$_{1/3}$Fe$_{1/3}$O$_2$) having an average particle size of 3 μm were used as a positive electrode active material, and 3% by weight of carbon fibers of vapor-phase growth serving as an electro conductive agent and having a fiber diameter of 0.1 μm, base on the weight of the positive electrode active material-containing layer, 5% by weight of a graphite powder, base on the weight of the positive electrode active material-containing layer, and 5% by weight of polytetrafluoroethylene (PTFE) as a binder, base on the weight of the positive electrode active material-containing layer, were mixed with the positive electrode active material, and the resultant mixture was dispersed in water to prepare a slurry. Then, the resultant slurry was applied onto both surfaces of a stainless steel foil having a thickness of 10 μm, dried, and pressed to produce a positive electrode having an electrode density of 3 g/cm$^3$.

A Li$_4$Ti$_5$O$_{12}$ powder having an average primary particle size (average primary particle diameter) of 0.5 μm, a graphite powder having an average particle size of 6 μm and serving as an electro conductive agent, and tetrafluoroethylene (PTFE) as a binder were mixed such that the weight ratio was 95:2:3 and then dispersed in water. The resultant dispersion was stirred using a ball mill under conditions in which rotational speed was 1000 rpm and a stirring time was two hours to prepare a slurry. The resultant slurry was applied onto both surfaces of a galvanized stainless steel foil having a thickness of 10 μm, dried, and heat-pressed to produce a negative electrode having an electrode density of 2.2 g/cm$^3$.

A nonwoven fabric formed of cellulose fibers, having an average fiber diameter of 1 μm, and having a thickness of 20 μm and a porosity of 65% was used as a separator. The positive electrode was covered with the separator, and the negative electrode was stacked so as to face the positive electrode via the separator. Also, a negative electrode active material-containing layer was disposed so as to protrude from an end of a positive electrode active material-containing layer. These were spirally wound to produce an electrode group. At that time, an electrode width of the positive electrode active material-containing layer was 50 mm, and an electrode width of the negative electrode active material-containing layer was 51 mm. This electrode group was pressed to be formed into a flat shape. The electrode group was stored in a container member which is a thin metal can formed of stainless steel and having a thickness of 0.25 mm. In that metal can, a valve which leaked gas when the internal pressure exceeded 2 atm pressure was installed as the rupture member.

On the other hand, as an electrolytic solution, Na$_2$S$_2$O$_3$.5H$_2$O was dissolved in 1 kg of water to obtain a sodium aqueous solution prepared such that Na$^+$ ion concentration was 3 mol/L. In order to form a Zn film on the surface of Li$_4$Ti$_5$O$_{12}$ primary particles, 1% by weight of ZnSO$_4$.7H$_2$O was added to the sodium aqueous solution. The electrolytic solution was injected into the electrode group in the container member, and a thin secondary battery having the structure shown in FIG. 1 and having a thickness of 16 mm, a width of 40 mm, and a height of 60 mm was produced.

Initial charge/discharge was applied to the obtained secondary battery such that after the secondary battery was charged up to 2.8 V at 25° C. and a constant current of 5 A (2 C), the secondary battery was discharged up to 1.5 V at 5 A, whereby a Zn film was formed on the surface of the Li$_4$Ti$_5$O$_{12}$ primary particles as a negative electrode active material. The thickness of the Zn film was 0.08 μm.

Example 2

A secondary battery was fabricated in the same manner as in Example 1 except that an anatase type TiO$_2$ powder having an average secondary particle size (diameter) of 10 µm was used as negative electrode active material particles.

Example 3

A secondary battery was fabricated in the same manner as in Example 1 except that a monoclinic $TiO_2$ powder having an average secondary particle size (diameter) of 10 µm was used as negative electrode active material particles.

Example 4

A negative electrode was produced in the same manner as in Example 1 except that an anatase type $TiO_2$ powder having an average secondary particle size (diameter) of 10 µm was used as negative electrode active material particles. As an electrolytic solution, $Na[N(FSO_2)_2]$ was dissolved in 1 kg of water to obtain a sodium aqueous solution having $Na^+$ ion concentration of 8 mol/L. In order to form a Zn film on the surface of the negative electrode active material particles, 1% by weight of $ZnSO_4 \cdot 7H_2O$ was added to the sodium aqueous solution. The Zn film was formed by initial charge/discharge under the same conditions as in Example 1. The thickness of the Zn film was 0.08 µm.

A secondary battery was fabricated in the same manner as in Example 1 except for the above.

Example 5

As an electrolytic solution, $Na[N(FSO_2)_2]$ was dissolved in 1 kg of water to obtain a sodium aqueous solution having $Na^+$ ion concentration of 6 mol/L. In order to form a Zn film on the surface of the negative electrode active material particles, 1% by weight of $ZnSO_4 \cdot 7H_2O$ was added to the sodium aqueous solution. The Zn film was formed by initial charge/discharge under the same conditions as in Example 1. The thickness of the Zn film was 0.08 µm.

A secondary battery was fabricated in the same manner as in Example 1 except for the above.

Example 6

As an electrolytic solution, 5 mol/L of $Na[N(FSO_2)_2]$ and 0.5 mol/L of $Na_2SO_4$ were dissolved in 1 kg of water to obtain a sodium aqueous solution having $Na^+$ ion concentration of 6 mol/L. In order to form a Zn film on the surface of the negative electrode active material particles, 1% by weight of $ZnSO_4 \cdot 7H_2O$ was added to the sodium aqueous solution. The Zn film was formed by initial charge/discharge under the same conditions as in Example 1. The thickness of the Zn film was 0.08 µm.

A secondary battery was fabricated in the same manner as in Example 1 except for the above.

Example 7

As an electrolytic solution, 4 mol/L of $Na[N(FSO_2)_2]$ and 1 mol/L of $Na_2SO_3$ were dissolved in 1 kg of water to obtain a sodium aqueous solution having $Na^+$ ion concentration of 6 mol/L. In order to form a Zn film on the surface of the negative electrode active material particles, 1% by weight of $ZnSO_4 \cdot 7H_2O$ was added to the sodium aqueous solution. The Zn film was formed by initial charge/discharge under the same conditions as in Example 1. The thickness of the Zn film was 0.08 µm.

A secondary battery was fabricated in the same manner as in Example 1 except for the above.

Example 8

As an electrolytic solution, 4 mol/L of $Na[N(FSO_2)_2]$ and 1 mol/L of NaSCN were dissolved in 1 kg of water to obtain a sodium aqueous solution having $Na^+$ ion concentration of 6 mol/L. In order to form a Zn film on the surface of the negative electrode active material particles, 1% by weight of $ZnSO_4 \cdot 7H_2O$ was added to the sodium aqueous solution. The Zn film was formed by initial charge/discharge under the same conditions as in Example 1. The thickness of the Zn film was 0.08 µm.

A secondary battery was fabricated in the same manner as in Example 1 except for the above.

Example 9

As an electrolytic solution, 4 mol/L of $Na[N(FSO_2)_2]$ and 1 mol/L of $Na_2S_2O_3 \cdot 5H_2O$ were dissolved in 1 kg of water to obtain a sodium aqueous solution having $Na^+$ ion concentration of 6 mol/L. In order to form a Zn film on the surface of the negative electrode active material particles, 1% by weight of $ZnSO_4 \cdot 7H_2O$ was added to the sodium aqueous solution. The Zn film was formed by initial charge/discharge under the same conditions as in Example 1. The thickness of the Zn film was 0.08 µm.

A secondary battery was fabricated in the same manner as in Example 1 except for the above.

Example 10

As an electrolytic solution, 4 mol/L of $Na[N(FSO_2)_2]$ and 2 mol/L of $Na[N(CF_3SO_2)_2]$ were dissolved in 1 kg of water to obtain a sodium aqueous solution having $Na^+$ ion concentration of 6 mol/L. In order to form a Zn film on the surface of the negative electrode active material particles, 1% by weight of $ZnSO_4 \cdot 7H_2O$ was added to the sodium aqueous solution. The Zn film was formed by initial charge/discharge under the same conditions as in Example 1. The thickness of the Zn film was 0.08 µm.

A secondary battery was fabricated in the same manner as in Example 1 except for the above.

Example 11

As an electrolytic solution, 5 mol/L of $Na[N(FSO_2)_2]$ and 1 mol/L of $NaCF_3SO_3$ were dissolved in 1 kg of water to obtain a sodium aqueous solution having $Na^+$ ion concentration of 6 mol/L. In order to form a Zn film on the surface of the negative electrode active material particles, 1% by weight of $ZnSO_4 \cdot 7H_2O$ was added to the sodium aqueous solution. The Zn film was formed by initial charge/discharge under the same conditions as in Example 1. The thickness of the Zn film was 0.08 µm.

A secondary battery was fabricated in the same manner as in Example 1 except for the above.

Example 12

As an electrolytic solution, 3 mol/L of $Na[N(FSO_2)_2]$ and 3 mol/L of $Na[N(C_2F_5SO_2)_2]$ were dissolved in 1 kg of water to obtain a sodium aqueous solution having $Na^+$ ion concentration of 6 mol/L. In order to form a Zn film on the surface of the negative electrode active material particles, 1% by weight of $ZnSO_4 \cdot 7H_2O$ was added to the sodium aqueous solution. The Zn film was formed by initial charge/discharge under the same conditions as in Example 1. The thickness of the Zn film was 0.08 μm.

A secondary battery was fabricated in the same manner as in Example 1 except for the above.

Example 13

As an electrolytic solution, 4 mol/L of $Na_2S_2O_3.5H_2O$ and 1 mol/L of $Na_2SO_4$ were dissolved in 1 kg of water to obtain a sodium aqueous solution having $Na^+$ ion concentration of 6 mol/L. In order to form a Zn film on the surface of the negative electrode active material particles, 1% by weight of $ZnSO_4.7H_2O$ was added to the sodium aqueous solution. The Zn film was formed by initial charge/discharge under the same conditions as in Example 1. The thickness of the Zn film was 0.08 μm.

A secondary battery was fabricated in the same manner as in Example 1 except for the above.

Example 14

As an electrolytic solution, $Na[N(FSO_2)_2]$ was dissolved in 1 kg of water to obtain a sodium aqueous solution having $Na^+$ ion concentration of 6 mol/L.

Also, an $Al_2O_3$ film was formed on the surface of negative electrode active material particles by the following method. $Al(NO_3)_2.9H_2O$ was added to an aqueous solution prepared by mixing 5 ml of polyvinyl alcohol and 10 ml of water, a $Li_4Ti_5O_{12}$ powder and 10 ml of water were added to this solution, and the resultant solution was stirred for six hours. After that, the resultant product was heat-treated at 600° C. in air for three hours, thus obtaining $Li_4Ti_5O_{12}$ particles covered with $Al_2O_3$. The thickness of the $Al_2O_3$ film was 0.05 μm.

A secondary battery was fabricated in the same manner as in Example 1 except for the above.

Example 15

A secondary battery was fabricated in the same manner as in Example 1 except that a sodium aqueous solution prepared in the same manner as in Example 6 was used and an $Al_2O_3$ film was formed in the same manner as in Example 14.

Example 16

A secondary battery was fabricated in the same manner as in Example 1 except that a sodium aqueous solution prepared in the same manner as in Example 7 was used and an $Al_2O_3$ film was formed in the same manner as in Example 14.

Example 17

A secondary battery was fabricated in the same manner as in Example 1 except that a sodium aqueous solution prepared in the same manner as in Example 8 was used and an $Al_2O_3$ film was formed in the same manner as in Example 14.

Example 18

A secondary battery was fabricated in the same manner as in Example 1 except that a sodium aqueous solution prepared in the same manner as in Example 9 was used and an $Al_2O_3$ film was formed in the same manner as in Example 14.

Example 19

A secondary battery was fabricated in the same manner as in Example 1 except that a sodium aqueous solution prepared in the same manner as in Example 10 was used and an $Al_2O_3$ film was formed in the same manner as in Example 14.

Example 20

A secondary battery was fabricated in the same manner as in Example 1 except that a sodium aqueous solution prepared in the same manner as in Example 11 was used and an $Al_2O_3$ film was formed in the same manner as in Example 14.

Example 21

A secondary battery was fabricated in the same manner as in Example 1 except that a sodium aqueous solution prepared in the same manner as in Example 12 was used and an $Al_2O_3$ film was formed in the same manner as in Example 14.

Example 22

A secondary battery was fabricated in the same manner as in Example 1 except that a sodium aqueous solution prepared in the same manner as in Example 13 was used and an $Al_2O_3$ film was formed in the same manner as in Example 14.

Example 23

A secondary battery was fabricated in the same manner as in Example 5 except that the sodium ion concentration was adjusted to 10 mol/L.

Example 24

As positive electrode active material particles, there was provided secondary particles include $NaFePO_4$ primary particles having an olivine structure and an average primary particle size of 50 nm, and carbon black particles having an average particle size of 5 nm and adhered to the surfaces of $NaFePO_4$ secondary particles. The amount of the adhered carbon black particles was 0.1% by weight in the positive electrode active material particles. Except for this, a positive electrode was produced in the same manner as in Example 1.

A secondary battery was obtained in the same manner as in Example 1 except for the above.

Examples 25 to 27

A secondary battery was obtained in the same manner as in Example 24 except that the anionic species and the Na ion concentration of the electrolytic solution were changed as shown in Table 2.

Comparative Examples 1 to 6

A thin secondary battery was fabricated in the same manner as described in Example 1 except that the positive electrode active material, the negative electrode active material, the negative electrode covering material, the anionic species of the electrolytic solution, and the Na ion concentration shown in the following Table 2 were used. As the electrolytic solution, an aqueous solution of a salt whose anionic species were shown in Table 2 and Na⁺ as cationic species was used.

After each of the obtained secondary batteries (except for Comparative Example 5) was charged up to 2.8 V at 25° C. and a constant current of 5 A, a discharge capacity obtained when the secondary battery was discharged up to 1.5 V at 5 A was measured. In Comparative Example 5, after the secondary battery was charged up to 4.2 V at 25° C. and a constant current of 5 A, a discharge capacity obtained when the secondary battery was discharged up to 2.5 V at 5 A was measured. The obtained discharge capacity as 25° C. discharge capacity was shown in Tables 3 and 4.

For each of the secondary batteries except for Comparative Example 5, as a cycle test, a charge-and-discharge cycle in which the secondary battery was charged up to 2.8 V at 25° C. and a constant current of 5 A and then discharged up to 1.5 V at 5 A was repeated, and a cycle number obtained when a 80% retention ratio of an initial capacity was achieved was taken to be a cycle life. In Comparative Example 5, a charge-and-discharge cycle in which the secondary battery was charged up to 4.2 V at 25° C. and a constant current of 5 A and then discharged up to 2.5 V at 5 A was repeated, and a cycle number obtained when a 80% retention ratio of an initial capacity was achieved was taken to be a cycle life. Tables 3 and 4 show the obtained cycle lives.

For each of the secondary batteries except for Comparative Example 5, as a large current discharge performance test, the secondary battery was charged up to 2.8 V at 5 A (2 C) and then discharged up to 1.5 V at 25 A (10 C), and a capacity retention at that time was obtained. Tables 3 and 4 show, as a large current discharge capacity retention, a value which represents the discharge capacity at 25 A when the discharge capacity at 5 A is 100%. Also, as a storage test, the secondary battery was charged up to 2.8 V at 5 A and then stored at 30° C. for one week, and the self-discharge rate thereafter was obtained. Tables 3 and 4 show, as a 30° C. storage self-discharge rate, a value which represents the discharge capacity after storage when the discharge capacity before storage is 100%.

As a large current discharge performance test for the secondary battery of Comparative Example 5, the secondary battery was charged up to 4.2 V at 5 A and then discharged up to 2.5 V at 25 A, and the capacity retention at that time was obtained. Also, as a storage test, the secondary battery was charged up to 4.2 V at 5 A and then stood at 30° C. for one week, and the self-discharge rate thereafter was obtained. When there are plural types of anionic species, the molar ratio of the anionic species is shown in parentheses in the column of the anionic species in the electrolytic solution of Table 1.

TABLE 1

| | Positive electrode active material | Negative electrode active material | Negative electrode covering material | Anion species of electrolytic solution (molar ratio) | Proportion of first anion (mol %) | Na⁺ concentration (mol/L) |
|---|---|---|---|---|---|---|
| Example 1 | $NaNi_{1/3}Mn_{1/3}Fe_{1/3}O_2$ | $Li_4Ti_5O_{12}$ | Zn | $S_2O_3^{2-}$ | 100 | 3 |
| Example 2 | $NaNi_{1/3}Mn_{1/3}Fe_{1/3}O_2$ | $TiO_2$ (anatase) | Zn | $S_2O_3^{2-}$ | 100 | 3 |
| Example 3 | $NaNi_{1/3}Mn_{1/3}Fe_{1/3}O_2$ | Monoclinic $TiO_2$ (B) | Zn | $S_2O_3^{2-}$ | 100 | 3 |
| Example 4 | $NaNi_{1/3}Mn_{1/3}Fe_{1/3}O_2$ | $TiO_2$ (anatase) | Zn | $[N(FSO_2)_2]^-$ | 100 | 8 |
| Example 5 | $NaNi_{1/3}Mn_{1/3}Fe_{1/3}O_2$ | $Li_4Ti_5O_{12}$ | Zn | $[N(FSO_2)_2]^-$ | 100 | 6 |
| Example 6 | $NaNi_{1/3}Mn_{1/3}Fe_{1/3}O_2$ | $Li_4Ti_5O_{12}$ | Zn | $[N(FSO_2)_2]^- + SO_4^{2-}$ (4:1) | 80 | 6 |
| Example 7 | $NaNi_{1/3}Mn_{1/3}Fe_{1/3}O_2$ | $Li_4Ti_5O_{12}$ | Zn | $[N(FSO_2)_2]^- + SO_4^{2-}$ (4:1) | 80 | 6 |
| Example 8 | $NaNi_{1/3}Mn_{1/3}Fe_{1/3}O_2$ | $Li_4Ti_5O_{12}$ | Zn | $[N(FSO_2)_2]^- + SCN^-$ (4:1) | 80 | 6 |
| Example 9 | $NaNi_{1/3}Mn_{1/3}Fe_{1/3}O_2$ | $Li_4Ti_5O_{12}$ | Zn | $[N(FSO_2)_2]^- + S_2O_3^{2-}$ (4:1) | 80 | 6 |
| Example 10 | $NaNi_{1/3}Mn_{1/3}Fe_{1/3}O_2$ | $Li_4Ti_5O_{12}$ | Zn | $[N(FSO_2)_2]^- + [N(CF_3SO_2)_2]^-$ (2:1) | 66 | 6 |
| Example 11 | $NaNi_{1/3}Mn_{1/3}Fe_{1/3}O_2$ | $Li_4Ti_5O_{12}$ | Zn | $[N(FSO_2)_2]^- + CF_3SO_3^-$ (5:1) | 83 | 6 |
| Example 12 | $NaNi_{1/3}Mn_{1/3}Fe_{1/3}O_2$ | $Li_4Ti_5O_{12}$ | Zn | $[N(FSO_2)_2]^- + [N(C_2F_5SO_2)_2]^-$ (1:1) | 50 | 6 |
| Example 13 | $NaNi_{1/3}Mn_{1/3}Fe_{1/3}O_2$ | $Li_4Ti_5O_{12}$ | Zn | $S_2O_3^{2-} + SO_4^{2-}$ (4:1) | 80 | 6 |
| Example 14 | $NaNi_{1/3}Mn_{1/3}Fe_{1/3}O_2$ | $Li_4Ti_5O_{12}$ | $Al_2O_3$ | $[N(FSO_2)_2]^-$ | 100 | 6 |
| Example 15 | $NaNi_{1/3}Mn_{1/3}Fe_{1/3}O_2$ | $Li_4Ti_5O_{12}$ | $Al_2O_3$ | $[N(FSO_2)_2]^- + SO_4^{2-}$ (4:1) | 80 | 6 |
| Example 16 | $NaNi_{1/3}Mn_{1/3}Fe_{1/3}O_2$ | $Li_4Ti_5O_{12}$ | $Al_2O_3$ | $[N(FSO_2)_2]^- + SO_3^{2-}$ (4:1) | 80 | 6 |
| Example 17 | $NaNi_{1/3}Mn_{1/3}Fe_{1/3}O_2$ | $Li_4Ti_5O_{12}$ | $Al_2O_3$ | $[N(FSO_2)_2]^- + SCN^-$ (4:1) | 80 | 6 |
| Example 18 | $NaNi_{1/3}Mn_{1/3}Fe_{1/3}O_2$ | $Li_4Ti_5O_{12}$ | $Al_2O_3$ | $[N(FSO_2)_2]^- + S_2O_3^{2-}$ (4; 1) | 80 | 6 |
| Example 19 | $NaNi_{1/3}Mn_{1/3}Fe_{1/3}O_2$ | $Li_4Ti_5O_{12}$ | $Al_2O_3$ | $[N(FSO_2)_2]^- + [N(CF_3SO_2)_2]^-$ (2:1) | 66 | 6 |
| Example 20 | $NaNi_{1/3}Mn_{1/3}Fe_{1/3}O_2$ | $Li_4Ti_5O_{12}$ | $Al_2O_3$ | $[N(FSO_2)_2]^- + CF_3SO_3^-$ (5:1) | 83 | 6 |
| Example 21 | $NaNi_{1/3}Mn_{1/3}Fe_{1/3}O_2$ | $Li_4Ti_5O_{12}$ | $Al_2O_3$ | $[N(FSO_2)_2]^- + [N(C_2F_5SO_2)_2]^-$ (1:1) | 50 | 6 |
| Example 22 | $NaNi_{1/3}Mn_{1/3}Fe_{1/3}O_2$ | $Li_4Ti_5O_{12}$ | $Al_2O_3$ | $S_2O_3^{2-} + SO_4^{2-}$ (4:1) | 80 | 6 |

TABLE 2

| | Positive electrode active material | Negative electrode active material | Negative electrode covering material | Anion species of electrolytic solution | Proportion of first anion (mol %) | Na⁺ concentration (mol/L) |
|---|---|---|---|---|---|---|
| Example 23 | $NaNi_{1/3}Mn_{1/3}Fe_{1/3}O_2$ | $Li_4Ti_5O_{12}$ | Zn | $[N(FSO_2)_2]^-$ | 100 | 10 |
| Example 24 | $NaFePO_4$ | $Li_4Ti_5O_{12}$ | Zn | $S_2O_3^{2-}$ | 100 | 3 |
| Example 25 | $NaFePO_4$ | $Li_4Ti_5O_{12}$ | Zn | $[N(FSO_2)_2]^-$ | 100 | 3 |
| Example 26 | $NaFePO_4$ | $Li_4Ti_5O_{12}$ | Zn | $[N(FSO_2)_2]^-$ | 100 | 4 |
| Example 27 | $NaFePO_4$ | $Li_4Ti_5O_{12}$ | Zn | $[N(FSO_2)_2]^-$ | 100 | 6 |
| Comparative Example 1 | $NaNi_{1/3}Mn_{1/3}Fe_{1/3}O_2$ | $Li_4Ti_5O_{12}$ | — | $S_2O_3^{2-}$ | 100 | 2.5 |
| Comparative Example 2 | $NaNi_{1/3}Mn_{1/3}Fe_{1/3}O_2$ | $Li_4Ti_5O_{12}$ | — | $Cl^-$ | — | 2 |

TABLE 2-continued

| | Positive electrode active material | Negative electrode active material | Negative electrode covering material | Anion species of electrolytic solution | Proportion of first anion (mol %) | Na+ concentration (mol/L) |
|---|---|---|---|---|---|---|
| Comparative Example 3 | NaNi$_{1/3}$Mn$_{1/3}$Fe$_{1/3}$O$_2$ | Li$_4$Ti$_5$O$_{12}$ | Zn | [N(CF$_3$SO$_2$)$_2$]$^-$ | — | 4 |
| Comparative Example 4 | NaNi$_{1/3}$Mn$_{1/3}$Fe$_{1/3}$O$_2$ | Li$_4$Ti$_5$O$_{12}$ | — | OH$^-$ | — | 2 |
| Comparative Example 5 | NaNi$_{1/3}$Mn$_{1/3}$Fe$_{1/3}$O$_2$ | Hard carbon | — | [N(CF$_3$SO$_2$)$_2$]$^-$ | — | 4 |
| Comparative Example 6 | NaNi$_{1/3}$Mn$_{1/3}$Fe$_{1/3}$O$_2$ | Li$_4$Ti$_5$O$_{12}$ | Zn | SO$_4^{2-}$ | — | 4 |

TABLE 3

| | 25° C. discharge capacity (mAh) | Large current discharge capacity retention (%) | Cycle life (times) | 30° C. storage self-discharge rate (%) |
|---|---|---|---|---|
| Example 1 | 2500 | 88 | 1000 | 8 |
| Example 2 | 2400 | 80 | 800 | 10 |
| Example 3 | 2600 | 82 | 1000 | 12 |
| Example 4 | 2600 | 85 | 1000 | 8 |
| Example 5 | 2700 | 93 | 1200 | 8 |
| Example 6 | 2500 | 90 | 1100 | 6 |
| Example 7 | 2500 | 91 | 1200 | 7 |
| Example 8 | 2500 | 88 | 1000 | 7 |
| Example 9 | 2500 | 88 | 1100 | 7 |
| Example 10 | 2600 | 85 | 1400 | 7 |
| Example 11 | 2300 | 80 | 1000 | 7 |
| Example 12 | 2600 | 89 | 1200 | 7 |
| Example 13 | 2400 | 80 | 900 | 10 |
| Example 14 | 2500 | 88 | 1200 | 7 |
| Example 15 | 2300 | 83 | 1100 | 6 |
| Example 16 | 2300 | 80 | 1200 | 6 |
| Example 17 | 2300 | 80 | 1050 | 6 |
| Example 18 | 2300 | 80 | 1200 | 6 |
| Example 19 | 2400 | 80 | 1200 | 4 |
| Example 20 | 2100 | 75 | 1300 | 6 |
| Example 21 | 2400 | 82 | 1300 | 6 |
| Example 22 | 2200 | 80 | 1000 | 6 |

TABLE 4

| | 25° C. discharge capacity (mAh) | Large current discharge capacity retention (%) | Cycle life (times) | 30° C. storage self-discharge rate (%) |
|---|---|---|---|---|
| Example 23 | 2500 | 85 | 1300 | 6 |
| Example 24 | 2000 | 80 | 1400 | 5 |
| Example 25 | 2100 | 85 | 1500 | 4 |
| Example 26 | 2200 | 82 | 1500 | 4 |
| Example 27 | 2300 | 80 | 1500 | 4 |
| Comparative Example 1 | 1000 | 40 | 200 | 30 |
| Comparative Example 2 | 500 | 40 | 100 | 50 |
| Comparative Example 3 | 1400 | 50 | 400 | 50 |
| Comparative Example 4 | 300 | 30 | 100 | 80 |
| Comparative Example 5 | 0 | 0 | 0 | 100 |
| Comparative Example 6 | 200 | 10 | 30 | 90 |

As seen in Tables 1 to 4, the secondary batteries of Examples 1 to 27 are excellent in discharge capacity, large current discharge performance, cycle life performance, and storage performance as compared with Comparative Examples 1 to 6.

Comparative Example 24 with Example 25 in which the positive electrode active material, the negative electrode active material, and the Na$^+$ concentration are the same, it is understood that Example 25 containing [N(FSO$_2$)$_2$]$^-$ as the first anion is excellent in discharge capacity, large current discharge performance, cycle life performance, and storage performance. A similar trend is also obtained from the comparison between Example 6 and Example 13.

Comparative Example 5 using only [N(FSO$_2$)$_2$]$^-$ as the first anion with Examples 6 to 12 using both of [N(FSO$_2$)$_2$] and other anions as the first anion, as to the storage performance, it is understood that Examples 6 to 12 are more excellent.

In Examples 6 to 12, Example 10 using [N(FSO$_2$)$_2$]$^-$ and [N(CF$_3$SO$_2$)$_2$]$^-$ as the first anion and Example 12 using [N(FSO$_2$)$_2$]$^-$ and N(C$_2$F$_5$SO$_2$)$_2$]$^-$ as the first anion are excellent in discharge capacity and also have good large current discharge performance, cycle life performance and storage performance, and it can be said that practicality is high.

Comparative Examples 5 to 13 containing Zn as a covering material with Examples 14 to 22 containing Al$_2$O$_3$ as a covering material, Examples 5 to 13 are more excellent in discharge capacity and large current discharge performance, so that it can be said that practicality is higher in Examples 5 to 13.

Comparison of Examples 1 to 3 reveals that Example 1 containing lithium titanium oxide as a negative electrode active material is excellent in large current discharge performance and storage performance and has good discharge capacity and cycle life performance, so that it can be said that practicality is high.

According to at least one of the above embodiments, since the secondary battery contains the aqueous electrolyte containing the cationic species containing Na$^+$ ions having a concentration of 3 mol/L or more and the anionic species containing one or more first anions selected from the group consisting of [N(FSO$_2$)$_2$]$^-$, SO$_3^{2-}$, S$_2$O$_3^{2-}$ and SCN$^-$, it is possible to provide a secondary battery excellent in cycle life performance, storage performance, and large current discharge performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
a positive electrode;
a negative electrode comprising titanium-containing oxide; and
an aqueous electrolyte comprising a sodium ion having a concentration of 3 mol/L or more and at least one type of first anion selected from the group consisting of $[N(FSO_2)_2]^-$, $SO_3^{2-}$, $S_2O_3^{2-}$ and $SCN^-$.

2. The secondary battery according to claim 1, wherein the aqueous electrolyte further comprises at least one type of second anion selected from the group consisting of $SO_4^{2-}$, $[N(CF_3SO_2)_2]^-$, $[N(C_2F_5SO_2)_2]^-$ and $CF_3SO_3^-$.

3. The secondary battery according to claim 2, wherein a molar ratio of the first anion to the second anion is in a range of 1:1 to 5:1.

4. The secondary battery according to claim 1, wherein the aqueous electrolyte further comprises at least one type of anion selected from the group consisting of $B[(OCO)_2]_2^-$, $CF_3CO_2^-$, $Cl^-$, $OH^-$, $PO_3^-$, $BO_2^-$, $NO_3^-$, and $NO_2^-$.

5. The secondary battery according to claim 1, wherein the aqueous electrolyte comprises a lithium salt.

6. The secondary battery according to claim 1, wherein the concentration of the sodium ion is in a range from 3 mol/L to 10 mol/L.

7. The secondary battery according to claim 1, wherein the negative electrode comprises particles of the titanium-containing oxide and a covering material covering at least a portion of surfaces of the particles and containing a Zn component.

8. The secondary battery according to claim 1, wherein the titanium-containing oxide comprises at least one kind of titanium oxide represented by a general formula $Li_xTiO_2$ ($0 \leq x \leq 1$) and lithium titanium oxide represented by a general formula $Li_{4+x}Ti_5O_{12}$ (x is $-1 \leq x \leq 3$).

9. A battery module comprising the secondary battery according to claim 1.

10. A battery pack comprising the secondary battery according to claim 1.

11. The battery pack according to claim 10, comprising a plural of secondary batteries, wherein the secondary batteries are electrically connected in series, in parallel, or in combination thereof.

12. The battery pack according to claim 10, further comprising a protective circuit and an external power distribution terminal.

13. A vehicle comprising the battery pack according to claim 10.

14. The vehicle according to claim 13, which comprises a mechanism configured to convert kinetic energy of the vehicle into regenerative energy.

15. The secondary battery according to claim 1, wherein the concentration of the sodium ion is in a range of 4 mol/L or more.

16. The secondary battery according to claim 1, wherein the secondary battery is configured to be charged up to 2.8 V and discharged up to 1.5 V.

17. The secondary battery according to claim 1, wherein the aqueous electrolyte comprises an aqueous solvent and a solute comprising the sodium ion and the at least one type of first anion, and an amount of the aqueous solvent is 1 mol or more per 1 mol of the solute.

18. The secondary battery according to claim 1, wherein the positive electrode comprises one or two or more kind of positive electrode active material selected from the group consisting of sodium manganese composite oxide, sodium nickel composite oxide, sodium cobalt composite oxide, sodium nickel cobalt manganese composite oxide, sodium iron composite oxide, sodium phosphorus oxide, sodium iron manganese composite oxide, sodium nickel titanium composite oxide, sodium nickel iron composite oxide, and sodium nickel manganese composite oxide.

19. The secondary battery according to claim 1, wherein the concentration of the sodium ion is 3-10 mol/L.

20. The secondary battery according to claim 15, wherein the concentration of the sodium ion is 4-8 mol/L.

* * * * *